United States Patent
John et al.

(10) Patent No.: US 11,252,691 B2
(45) Date of Patent: Feb. 15, 2022

(54) APPARATUS, SYSTEM AND METHOD OF LOCATION MAPPING

(71) Applicant: INTEL IP CORPORATION, Santa Clara, CA (US)

(72) Inventors: Sudhanshu John, Portland, OR (US); Gang Shen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 89 days.

(21) Appl. No.: 16/233,417

(22) Filed: Dec. 27, 2018

(65) Prior Publication Data

US 2020/0213969 A1    Jul. 2, 2020

(51) Int. Cl.
  *H04W 72/04* (2009.01)
  *H04W 64/00* (2009.01)
  *H04W 4/029* (2018.01)
  *H04B 17/318* (2015.01)
  *H04W 4/02* (2018.01)

(52) U.S. Cl.
  CPC ........ *H04W 64/003* (2013.01); *H04B 17/318* (2015.01); *H04W 4/023* (2013.01); *H04W 4/025* (2013.01); *H04W 4/029* (2018.02)

(58) Field of Classification Search
  None
  See application file for complete search history.

(56) References Cited

U.S. PATENT DOCUMENTS

2019/0378282 A1* 12/2019 Rogan ............... B60D 1/06

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

*Primary Examiner* — Willie J Daniel, Jr.
(74) *Attorney, Agent, or Firm* — Shichrur & Co.

(57) ABSTRACT

For example, a location processing device may be configured to determine a plurality of 3D location vectors between a respective plurality of pairs of wireless communication devices based on a plurality of pair-wise distance estimations corresponding to the plurality of pairs of the wireless communication devices, a 3D location vector corresponding to a pair of wireless communication devices including a vector between estimated 3D locations of the pair of wireless communication devices; to determine a plurality of 2D location vectors of the plurality of pairs of wireless communication devices on a 2D plane by projecting the plurality of 3D location vectors onto the 2D plane; and to determine a 2D mapping of 2D locations of the plurality of pairs of wireless communication devices based on the plurality of 2D location vectors. Additionally or alternatively, a 3D mapping may be determined based on a projection of 2D location vectors.

13 Claims, 9 Drawing Sheets

APPARATUS, SYSTEM AND METHOD OF LOCATION MAPPING

TECHNICAL FIELD

Embodiments described herein generally relate to location mapping.

BACKGROUND

Location information of devices, e.g., Internet of Things (IoT) devices, may be essential in one or more applications, e.g., IoT applications, Smart Home applications, Smart Building applications and the like.

An application and/or a service may be expected to provide location information with respect to the devices.

For example, the service may be expected to provide location information for one or more requests like "where did I put cell phone?", and/or "turn off the light to the right of TV".

Accordingly, there is a need for technical solutions to provide accurate location information.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
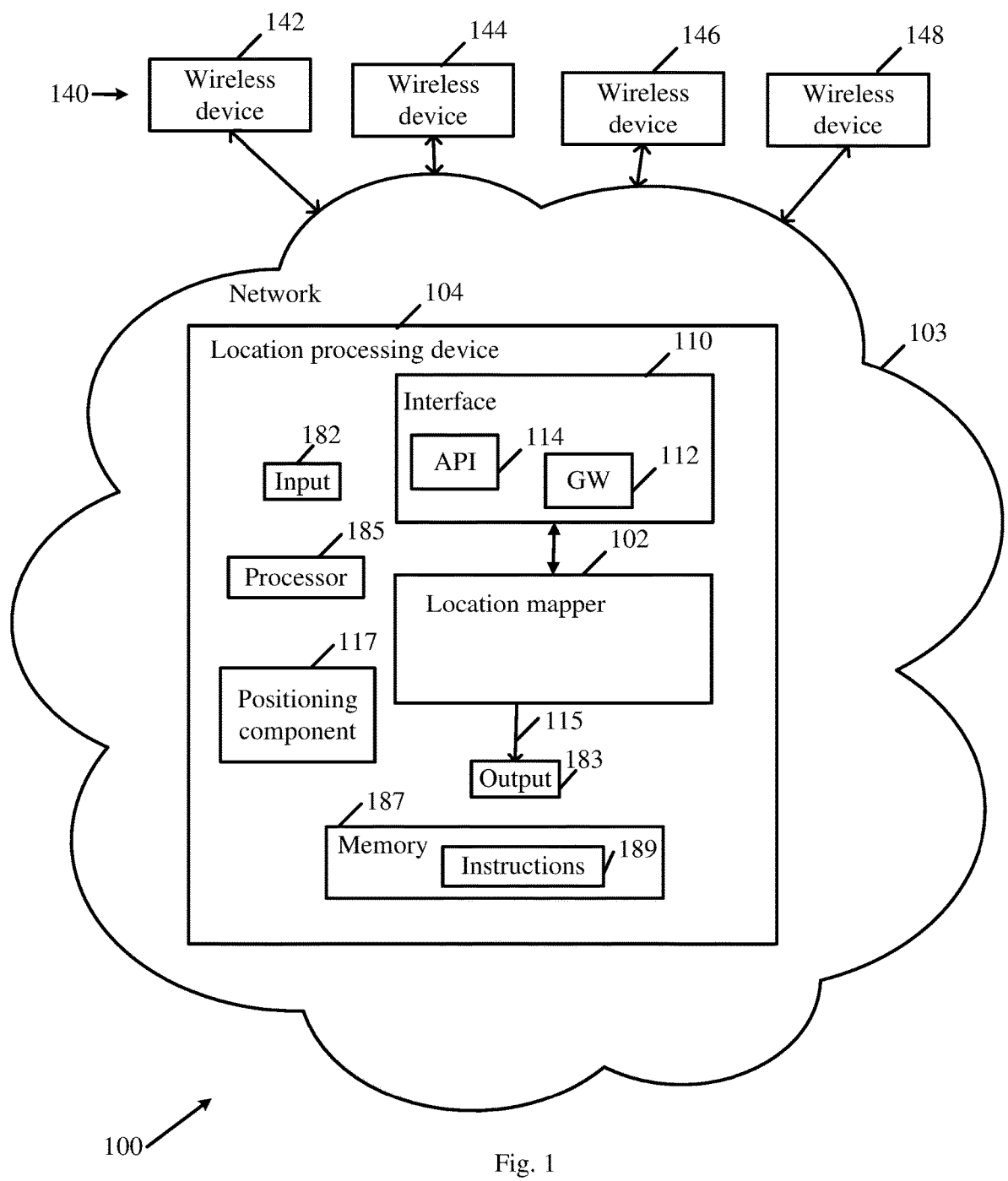
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a FLASH memory, a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); and/or IEEE 802.11az (IEEE 802.11az, Next Generation Positioning)), devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless communication device", as used herein, includes, for example, a device capable of wireless communication, a communication device capable of wireless communication, a communication station capable of wireless communication, a portable or non-portable device capable of wireless communication, or the like. In some demonstrative embodiments, a wireless communication device may be or may include a peripheral that is integrated with a computer, or a peripheral that is attached to a computer. In some demonstrative embodiments, the term "wireless communication device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

In some demonstrative embodiments, system 100 may include a location processing device 104 configured to implement, operate as, perform one or more operations of, and/or perform one or more functionalities of a location mapper 102, e.g., as described below.

In some embodiments, location processing device 104 may include a local computer, a remote computer, a desktop, a mobile computer, server, a distributed computing system, and/or the like. In other embodiments, location processing device 104 may include any other suitable computing arrangement and/or scheme.

In some demonstrative embodiments, location processing device 104 may include a memory 187 having stored thereon instructions 189.

In some demonstrative embodiments, location processing device 104 may include a processor 185 to execute instructions 189.

In some demonstrative embodiments, processor 185 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 185 may execute instructions 189 resulting in location mapper 102, instructions of an Operating System (OS) of location processing device 104 and/or of one or more suitable applications.

In some demonstrative embodiments, memory 187 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. In one example, memory 187 may store instructions 189 to be processed by processor 185.

In some demonstrative embodiments, location processing device 104 may also include an input 182 and/or an output 183.

In some demonstrative embodiments, input 182 may include, for example, a keyboard, a keypad, a mouse, a touch-screen, a touch-pad, a track-ball, a stylus, a microphone, or other suitable pointing device or input device.

In some demonstrative embodiments, output 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices. In one example, output unit 183 may be configured to output and display information 115 processed by location mapper 102.

In some demonstrative embodiments, location processing device 104 may optionally include any other suitable hardware components and/or software components.

In some demonstrative embodiments, some or all of the components of one or more of location processing device 104 may be enclosed in a common housing or packaging, and may be interconnected or operably associated using one or more wired or wireless links. In other embodiments, components of one or more of location processing device 104 may be distributed among multiple or separate devices.

In some demonstrative embodiments, system 100 may include a plurality of wireless communication devices 140.

In some demonstrative embodiments, system 100 may include a first wireless communication device 142, a second wireless communication device 144, a third wireless communication device 146, and/or a fourth wireless communication device 148.

In some demonstrative embodiments, location processing device 104 may be separate from the plurality of wireless communication devices.

For example, location processing device 104 may include a server, a web server, and the like, having an interface to the plurality of wireless communication devices.

In other embodiments, location processing device 104 may be implemented as part of the plurality of wireless communication devices 140.

For example, one of wireless communication devices 142, 144, 146, or 148 may include location processing device 104.

In some demonstrative embodiments, location processing device 104 may include a network interface 110 to communicate via a communication network 103.

In some demonstrative embodiments, communication network 103 may include a wired network, a wireless communication network, and/or any other combination of wireless/wired network.

In some demonstrative embodiments, communication network 103 may include, for example, a radio channel, a cellular channel, an RF channel, a WiFi channel, an IR channel, a Bluetooth (BT) channel, and or any other wireless network.

In some demonstrative embodiments, communication network 103 may include, for example, a Local Are Network (LAN), a Peripheral Component Interconnect (PCI) Express access network, and/or any other wired network.

In some demonstrative embodiments, network interface 110 may be configured to communicate with the plurality of wireless communication devices 140, e.g., as described below.

In some demonstrative embodiments, network interface 110 may be associated with and/or may include, for example, a gateway (GW) 112 and/or an application programming interface (API) 114, for example, to transfer and receive information between location processing device 104 and one or more other, e.g., internal or external, parties, users, applications and/or systems.

In some demonstrative embodiments, GW 112 may be configured to communicate with the plurality of wireless communication devices 140, for example, via a wired connection, via a wireless connection, via an Internet gateway, and/or the like.

In one example, GW 112 may be configured to communicate with the plurality of wireless communication devices 140 via a wired and/or an Internet gateway.

In another example, GW 112 may be configured to communicate with the plurality of wireless communication devices 140 via a wireless connection.

In some demonstrative embodiments, API 114 may include any suitable API and/or any other suitable interface, e.g., location processing device 104 to interact with wireless communication devices 1401 ocation processing device 104.

In some demonstrative embodiments, network interface 110 may be part of location processing device 104. In other embodiments, one or more elements of network interface 110, e.g., GW 112, API 114, and/or any other component or element of network interface 110 may be part of and/or distributed between any other elements of system 100 and/or any other computing systems.

In some demonstrative embodiments, location information of devices, e.g., wireless communication devices 140, may be useful, or even essential in some cases, in one or more applications, e.g., Internet of Things (IoT) applications, smart home applications, smart building applications, and the like.

In some demonstrative embodiments, location processing device 104 may be configured to provide location information, for example, in response to one or more requests from a service, e.g., "where did I put cell phone?", or "turn off the light to the right of TV".

In some demonstrative embodiments, location processing device 104 may be configured to support a location capability to provide location information, for example, including relative position information of devices in a defined area, e.g., a home, a building, and/or the like.

In one example, a home, an office, or a building may include tens or hundreds of wireless communication devices, e.g., Access Points, WiFi range extenders, PCs, IP cameras, Gateways, cell phones, motion sensors, and the like. According to this example, one or more applications, e.g., intelligent computing services, immersive computing services, home surveillance applications, pet tracking applications, elderly monitoring applications, and/or any other application, may require location information, e.g., a relative location, of each wireless communication device, for example, to track or locate one or more devices.

In some demonstrative embodiments, in some use cases, implementations and/or scenarios, it may not be efficient and/or effective to use additional equipment and/or devices, e.g., beacon devices, for example, to provide the location information. This may require, for example, the separate deployment of one or more specific location devices.

In some demonstrative embodiments, in some use cases, implementations and/or scenarios, it may not be efficient and/or effective to rely solely on a range measurement between two devices (also referred to as "pair-wise distance").

In one example, the pair-wise distance may not be accurate, for example, due to noise and/or time synchronization issues.

In some demonstrative embodiments, location processing device 1041 ocation mapper 102 may be configured to process and/or provide location information corresponding to the wireless communication devices 140, e.g., as described below.

In some demonstrative embodiments, processor 185 may execute instructions 189, which may result in location mapper 102.

In some demonstrative embodiments, location mapper 102 may be associated with and/or implemented as part of location processing device 104.

In one example, location mapper 102 may be implemented, for example, as middleware, as part of any suitable application, and/or as part of a server.

In some demonstrative embodiments, location mapper 102 may be implemented using any suitable hardware components and/or software components, for example, processors, controllers, memory units, storage units, input units, output units, communication units, operating systems, and/or applications.

In some demonstrative embodiments, location mapper 102 may include, or may be part of a local application, a software, a computer program, or the like.

In some demonstrative embodiments, location mapper 102 may include, or may be part of a Web-based application, a web-site, a web-page, a stand-alone application, a plug-in, an ActiveX control, a rich content component (e.g., a Flash or Shockwave component), a cloud application and/or service, or the like.

In some demonstrative embodiments, location mapper 102 may include a local or remote application, e.g., executed by location processing device 104.

In some demonstrative embodiments, location mapper 102 may be configured to provide the location information with respect to wireless communication devices 140, for example, even without using any additional and/or external devices and/or equipment, e.g., as described below.

In some demonstrative embodiments, location mapper 102 may be configured to provide accurate estimations of pair-wise distances, e.g., as described below.

In some demonstrative embodiments, location mapper 102 may be configured to construct a three-dimensional (3D) mesh network of locations of wireless nodes, for example, for illustration and/or further reference, e.g., as described below.

In some demonstrative embodiments, location mapper 102 may be configured to support and/or implement a 3D to two-dimensional (2D) map projection, e.g., as described below.

In some demonstrative embodiments, location mapper 102 may be configured to support and/or implement a 2D to 3D map projection, e.g., as described below.

In some demonstrative embodiments, location mapper 102 may be configured to support and/or implement the operations described above, for example, using channel state information, e.g., as defined in one or more wireless standards, a localization algorithm, e.g., a Multi-Dimensional Scaling (MDS) algorithm, and/or real world coordinates, e.g., as described below.

In some demonstrative embodiments, location mapper 102 may be configured to collect and/or determine the pair-wise distances, e.g., in the wireless system including wireless communication devices, apply an MDS algorithm, and/or apply real-world location projections and/or references, for example, to wireless nodes in the 2D plane and/or the 3D plane, e.g., as described below.

In some demonstrative embodiments, location mapper 102 may be configured to support and/or implement a 2D to 3D map projection and/or a 3D to 2D map projection for 2D and/or 3D locations, for example, based on triangulation methods, e.g., Time of Flight (ToF), Angle of Arrival (AoA), Received Signal Strength Indication (RSSI), e.g., as described below.

In some demonstrative embodiments, location mapper 102 may be configured to support and/or implement a method of using a 2D map to produce a 3D map, for example, with an improved accuracy, e.g., of objects of interest, In some demonstrative embodiments, location mapper 102 may be configured to support and/or implement a method of using a 3D map to project a 2D map with an improved accuracy, for example, of objects of interest, e.g., as described below.

In some demonstrative embodiments, location mapper 102 may be configured to process location information of wireless communication devices 140 according to a non-intrusive and/or fully automatic approach, which may use wireless signal statistics of wireless communication devices 140, for example, to detect relative locations, e.g., with respect to distances, angles, and the like, of the plurality of wireless communication devices at a suitable accuracy, e.g., as described below.

In some demonstrative embodiments, location mapper 102 may be configured to improve accuracy of 2D coordinates, for example, based on the MDS algorithm, e.g., as described below.

In some demonstrative embodiments, location mapper 102 may be configured to utilized a 2D map to create a 3D map of device locations and vice versa, e.g., as described below.

In some demonstrative embodiments, location mapper 102 may be configured to determine a 3D mesh network of relative device locations with an improved accuracy, for example, based on a localization algorithm, e.g., an MDS algorithm, for N nodes, for example, based on pair-wise distance estimations, e.g., using ToF measurements, RSSI measurements, AoA measurements or any other ranging estimations.

In some demonstrative embodiments, location mapper 102 may be configured to support and/or implement 3D to 2D mapping of a coordinate system and vice versa, e.g., as described below.

In some demonstrative embodiments, location mapper 102 may be configured to use ranging estimations, e.g., ToF measurements, RSSI measurements, AoA measurements and/or any other ranging estimations, for example, to improve an accuracy of a location estimation of a device in a 2D or 3D space, and/or to project real time and/or non-real time coordinates on a 2D plane or a 3D plane, e.g., as described below.

In some demonstrative embodiments, a pair-wise distance estimation between a wireless communication device and a plurality of other wireless communication devices, may be based, for example, on ToF measurements, RSSI measurements, AoA measurements, fingerprinting, and/or any other ranging techniques.

In one example, a pair-wise distance estimation may be determined based, for example, on a combination of AoA measurements and a pair-wise distance e.g., as described below.

In some demonstrative embodiments, location mapper 102 may be configured to compensate an error margin by utilizing a localization algorithm, e.g., MDS, for example, when signal noise and time synchronization may cause unbearable error margins.

In some demonstrative embodiments, nodes in a wireless network, e.g., location processing device 104 and/or wireless communication devices 140, may be configured to periodically calculate pair-wised distance estimates between the nodes in the wireless network.

In some demonstrative embodiments, the pair-wise distance estimations between the nodes may be gathered and/or collected by location processing device 104, e.g., via GW 112 and/or a location server.

In some demonstrative embodiments, location mapper 102 may be configured to apply a localization algorithm e.g., a metric MDS algorithm, for example, to the pair-wised distance estimates, for example, to generate 3D mesh network including some or all of the nodes in the wireless network.

In some demonstrative embodiments, location mapper 102 may be configured to provide a location reference of physical coordinates, e.g. real world coordinates of a level sensor, an AP or the like, and/or to project locations of the nodes of the wireless network into real world coordinates, e.g., as described below.

In some demonstrative embodiments, location mapper 102 may be configured to perform a pair-wise distance estimation, for example, based on ToF measurements, RSSI measurements, AoA measurements and/or any other ranging measurement.

In some demonstrative embodiments, location mapper 102 may be configured to perform ToF measurements, RSSI measurements, AoA measurements and/or any other ranging measurement, for example, when location processing device 104 is implemented as part of a wireless communication device, which is part of a wireless communication network of wireless communication devices 140.

In some demonstrative embodiments, location processing device 104 may include a positioning component 117 configured to perform a pair-wise distance estimation, for example, by performing ToF measurements, RSSI measurements, AoA measurements or any other ranging measurement.

In some demonstrative embodiments, positioning component 117 may be implemented as part of location mapper 102. In other embodiments, positioning component 117 and location mapper 102 may be implemented by separate elements of location processing device 104.

In some demonstrative embodiments, positioning component 117 may be configured to perform one or more pair-wise distance estimations, operations and/or communications, e.g., as described below.

In some demonstrative embodiments, positioning component 117 may be configured to perform one or more operations and/or communications of ToF measurements, RSSI measurements, AoA measurements and/or any other ranging measurement. In other embodiments, Positioning component 117 may be configured to perform one or more operations and/or communications of any other positioning measurement.

In some demonstrative embodiments, positioning component 117 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of positioning component 117. Additionally or alternatively, one or more functionalities of positioning component 117 may be implemented by logic, which may be executed by a machine and/or one or more processors, e.g., as described below.

In some demonstrative embodiments, positioning component 117 may be configured to trigger communication of one or more ranging messages and/or positioning packets, for example, sounding signals and/or Null-Data Packets (NDPs), e.g., as described below.

In some demonstrative embodiments, positioning component 117 may be configured to trigger ranging transmissions and/or measurements, for example, periodically and/or or upon a request from location mapper 102.

Some demonstrative embodiments are described herein with respect to a positioning component, e.g., positioning component 117, configured to perform measurements according to pair-wise distance estimations. However, in other embodiments, the positioning component 117 may be configured to perform any other additional or alternative type of Time of Flight (ToF) measurements, VHT ranging measurements, HE ranging measurements, ranging measurements, positioning measurements, proximity measurements, AoA measurements, RSSI measurements, and/or location estimation measurements, e.g., according to any additional or alternative protocol and/or procedure.

Figure 2:
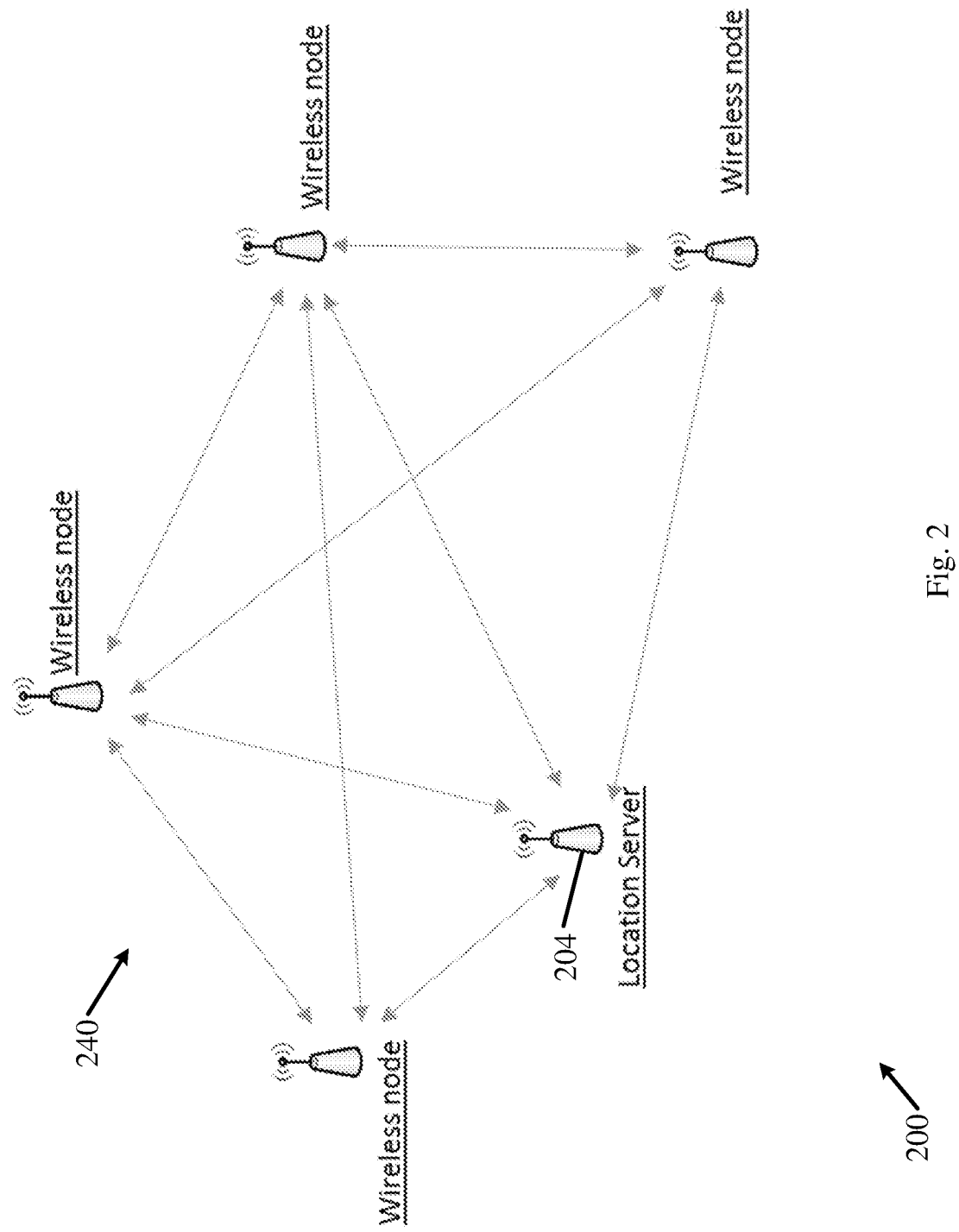
FIG. 2 is a schematic illustration of a system deployment, in accordance with some demonstrative embodiments.

Reference is made to FIG. 2, which schematically illustrates a deployment of a system 200, in accordance with some demonstrative embodiments.

In some demonstrative embodiments, as shown in FIG. 2, system 200 may include a wireless network including a plurality of wireless nodes, e.g., a plurality of wireless communication devices 240. For example, the plurality of wireless communication devices 140 (FIG. 1) may perform one or more operations of, one or more functionalities of, the functionality of and/or the role of, the plurality of wireless communication devices 240.

In one example, the plurality of wireless communication devices 240 may include wireless communication devices that reside in a wireless network. For example, APs, range extenders, and/or any other wireless communication devices may be wireless nodes in system 200.

In some demonstrative embodiments, a designated wireless communication device of the plurality of wireless communication devices 240, e.g., a location-processing device 204 which may have an increased processing power, may be designated as a "location server".

In some demonstrative embodiments, location-processing device 204 may be configured to communicate with other wireless communication devices of wireless communication devices 240, and/or to receive pair-wise distance information from each device of wireless communication devices 240. For example, location processing device 104 (FIG. 1) may perform one or more operations of, one or more functionalities of, the functionality of and/or the role of, location-processing device 204.

In some demonstrative embodiments, a wireless communication device 240, e.g., each wireless communication device of the plurality of wireless communication devices 240, may be configured to probe surrounding wireless communication devices, for example, by broadcasting packets, e.g., periodically.

In some demonstrative embodiments, the wireless communication device 240 may be configured to estimate a pair-wise distance with another wireless device, for example, based on a ToF measurement via Channel State Information (CSI), and/or any other measurement.

In some demonstrative embodiments, the wireless communication device 240 may be configured to send pair-wise distance estimate to location-processing device 204.

In some demonstrative embodiments, location-processing device 204 may be configured to collect the pair-wise distance estimates from the plurality of wireless communication devices 240 in the wireless network.

In one example, the wireless network may include n nodes, e.g., nodes A0, A1, . . . An−1. According to this example, location-processing device 204 may use the pair-wise distance estimates to form an n×n matrix M, in which the main diagonal is equal to zero, e.g., M[i][1]=0, and/or each item in the matrix corresponds to pair-wise distance, e.g., W[i][j]=the distance between node i and node j.

In some demonstrative embodiments, location-processing device 204 may be configured to apply a localization algorithm, e.g., an MDS algorithm, on the matrix M, for example, to improve an accuracy and/or to generate a 3D mesh network of the plurality of wireless nodes 240.

In some demonstrative embodiments, location-processing device 204 may be configured to use an AoA measurement, for example, to project the mesh network into real-world coordinates, e.g., real-world 3D coordinates.

In some demonstrative embodiments, location-processing device 204 may be configured provide a retrieval interface, e.g., interface 110 (FIG. 1), of location information of the nodes, for example, for other applications.

Referring back to FIG. 1, in some demonstrative embodiments, location mapper 102 may be configured to determine a 2D mapping of 2D locations corresponding to wireless communication devices 140, for example, based on 3D location vectors corresponding to wireless communication devices 140, e.g., as described below.

In some demonstrative embodiments, location mapper 102 may be configured to determine a plurality of 3D location vectors between a respective plurality of pairs of wireless communication devices 140, e.g., as described below.

In some demonstrative embodiments, location mapper 102 may be configured to determine the plurality of 3D location vectors between the plurality of pairs of wireless communication devices 140, for example, based on a plurality of pair-wise distance estimations corresponding to the plurality of pairs of the wireless communication devices 140, e.g., as described below.

In some demonstrative embodiments, a 3D location vector corresponding to a pair of wireless communication devices 140 may include a vector between estimated 3D locations of the pair of wireless communication devices 140, e.g., as described below.

In some demonstrative embodiments, location mapper 102 may be configured to determine the plurality of 3D location vectors by applying a localization algorithm to the plurality of pair-wise distance estimations, e.g., as described below.

In some demonstrative embodiments, location mapper 102 may be configured to determine the plurality of 3D location vectors by determining a 3D distance matrix, for example, based on the plurality of pair-wise distance estimations, and applying an MDS algorithm to the 3D distance matrix, e.g., as described below.

In some demonstrative embodiments, location mapper 102 may be configured to determine a plurality of 2D location vectors of the plurality of pairs of wireless communication devices 140 on a 2D plane, for example, by projecting the plurality of 3D location vectors onto the 2D plane, e.g., as described below.

In some demonstrative embodiments, location mapper 102 may be configured to determine a 2D mapping of 2D locations of the plurality of pairs of wireless communication devices 140, for example, based on the plurality of 2D location vectors, e.g., as described below.

\In some demonstrative embodiments, location mapper 102 may be configured to determine the 2D mapping of the 2D locations of the plurality of pairs of wireless communication devices 140, for example, by applying a localization algorithm to the plurality of 2D location vectors, e.g., as described below.

In some demonstrative embodiments, location mapper 102 may be configured to determine the 2D mapping of the 2D locations of the plurality of pairs of wireless communication devices 140, for example, by determining a 2D distance matrix based on the plurality of 2D location vectors, and applying an MDS algorithm to the 2D distance matrix, e.g., as described below.

In some demonstrative embodiments, location mapper 102 may be configured to determine a spanned plane, which is spanned by a first 3D location vector and a second 3D location vector, e.g., as described below.

In some demonstrative embodiments, the first 3D location vector may be between estimated 3D locations of a first wireless communication device, for example, device 142, and a second wireless communication device, for example, device 144, e.g., as described below.

In some demonstrative embodiments, the second 3D location vector may be between estimated 3D locations of the second wireless communication device, for example, device 144, and a third wireless communication device, for example, wireless communication device 146, e.g., as described below.

In some demonstrative embodiments, location mapper 102 may be configured to determine a first 2D location vector between the first wireless communication device and the second wireless communication device, for example, by projecting the first 3D location vector from the spanned plane to the 2D plane, e.g., as described below.

In some demonstrative embodiments, location mapper 102 may be configured to determine a second 2D location vector between the second wireless communication device and the third wireless communication device by projecting the second 3D location vector from the spanned plane to the 2D plane, e.g., as described below.

In some demonstrative embodiments, location mapper 102 may be configured to determine the first 2D location vector, for example, by applying to the first 3D location vector a projection $\{A(A^TA)^{-1}A^T\}$, and to determine the second 2D location vector by applying to the second 3D location vector the projection $\{A(A^TA)^{-1}A^T\}$, wherein A denotes a span of the first and second 3D location vectors, e.g., as described below.

In some demonstrative embodiments, location mapper 102 may be configured to select the first and second 3D location vectors from the plurality of 3D location vectors based on a determination that the first and second 3D location vectors are non-collinear, e.g., as described below.

In some demonstrative embodiments, computing device 140 may be part of at least one pair of the plurality of pairs of wireless communication devices, for example, when location processing device 104 is implemented as part of the wireless communication network of wireless communication devices 140.

In some demonstrative embodiments, location mapper 102 may be configured to determine at least one pair-wise distance estimation corresponding to the at least one pair that includes location processing device 104, for example, using positioning component 117, e.g., as described below.

location processing device 104 In some demonstrative embodiments, location mapper 102 may be configured to determine a 3D mapping of 3D locations corresponding to wireless communication devices 140, for example, based on 2D location vectors corresponding to wireless communication devices 140, e.g., as described below.

In some demonstrative embodiments, location mapper 102 may be configured to determine a plurality of 2D location vectors corresponding to the plurality of wireless communication devices 140, for example, based on a plurality of pair-wise distance estimations corresponding to a plurality of pairs of the wireless communication devices 140, e.g., as described below.

In some demonstrative embodiments, a pair-wise distance estimation corresponding to a pair of wireless communication devices 140, may be based on one or more measurements of wireless communication signals between the pair of wireless communication devices, e.g., as described below.

In some demonstrative embodiments, a pair-wise distance estimation corresponding to a pair of wireless communication devices 140, may include a ToF estimation, an RSSI estimation, an AoA estimation, and/or any other ranging estimation.

In some demonstrative embodiments, location mapper 102 may be configured to determine the plurality of 2D location vectors, for example, by applying a localization algorithm to the plurality of pair-wise distance estimations, e.g., as described below.

In some demonstrative embodiments, location mapper 102 may be configured to determine the plurality of 2D location vectors, for example, by determining a 2D distance matrix, for example, based on the plurality of pair-wise distance estimations, and applying an MDS algorithm to the 2D distance matrix, e.g., as described below.

In some demonstrative embodiments, location mapper 102 may be configured to determine a plurality of 3D locations of the plurality of wireless communication devices 140 based on a 2D to 3D (2D-3D) projection, e.g., as described below.

In some demonstrative embodiments, the 2D-3D projection may be configured to project a 2D location vector of a wireless communication device of wireless communication devices 140, e.g., wireless communication device 142, to a 3D location of the wireless communication device, for example, by determining a plane corresponding to the wireless communication device, and determining the 3D location of the wireless communication device, for example, based on a projection between the plane corresponding to the wireless communication device and a plane including the 2D location vector of the wireless communication device, e.g., as described below.

In some demonstrative embodiments, location mapper 102 may be configured to determine a 3D mapping of 3D locations of the plurality of wireless communication devices 140, for example, based on the plurality of 3D location vectors, e.g., as described below.

In some demonstrative embodiments, location mapper 102 may be configured to determine the 3D location of the wireless communication device, e.g., wireless communication device 142, for example, based on a requirement that a normal vector of the plane corresponding to the wireless communication device is parallel to a difference vector from the 2D location vector of the wireless communication device to the 3D location of the wireless communication device, e.g., as described below.

In some demonstrative embodiments, location mapper 102 may be configured to determine a potential plane corresponding to the wireless communication device, e.g., as described below.

In some demonstrative embodiments, the potential plane may include a plane in which the wireless communication device may be expected to be located.

In one example, the potential plane corresponding to the wireless communication device may include a floor plane, e.g., in a building, or any other plane in a predefined 3D space.

In some demonstrative embodiments, location mapper 102 may be configured to determine the plane corresponding to the wireless communication device based on an identifier of the device, e.g., as described below.

In other embodiments, the plane corresponding to the wireless communication device may be defined and/or determined base don any other additional or alternative parameter and/or criterion.

In some demonstrative embodiments, location mapper 102 may be configured to select the plane corresponding to the wireless communication device from a plurality of predefined potential planes corresponding to the wireless communication device, e.g., as described below.

In some demonstrative embodiments, location mapper 102 may be configured to determine a potential 3D location, for example, based on a requirement that a normal vector of the potential plane may be parallel to a difference vector from the 2D location vector of the wireless communication device to the potential 3D location, e.g., as described below.

In one example, a 2D location vector, which may be represented by a "2D point", denoted, may be defined as $\vec{D}=(x2, y2, 0)$. The 2D location vector D may be projected to a potential 3D location vector, denoted $\vec{C}$, in a potential 3D plane. For example, the 3D location vector may be defined as $\vec{C}=(x1, y1, z1)$.

For example, a projection of a 3D point from the potential 3D Plane to the 2D point on a 2D plane may be performed by a projection $\{A(A^TA)^{-1}A^T\}$, wherein A is the span of 3D vectors in the potential 3D plane.

For example, the potential 3D plane may be defined based on a normal vector, denoted $\dot{N}$, e.g., as follows:

$$\begin{cases} ax+by+xz+d=0 \exists\, (x,y) \in \{A(A^TA)^{-1}A^T\} \\ \exists\, 2D \text{ span with } z=0 \\ \text{Normal vector plane } \vec{N}=(a,b,c) \end{cases} \quad (1)$$

According to this example, a difference vector, denoted $\vec{CD}$, from the 2D location vector $\vec{D}$ to the potential 3D location vector $\vec{C}$ may be required to be parallel to the normal vector $\vec{N}$, e.g., as follows:

$$\frac{x2-x1}{a} = \frac{y2-y1}{b} = \frac{0-z1}{c} = k \text{ and } ax+by+xz+d=0 \quad (2)$$

In one example, a simple rotation may be used to determine the potential 3D location.

In one example, the normal vector $\vec{N}$ may be defined as $\vec{N}=(4, -1, 2)$, and, therefore, the equation of the plane may be $4x-y+z+d=0$.

According to this example, one basis for the 3D space may be determined based on the span A, e.g., as follows:

$$A = \begin{pmatrix} 1 & 0 \\ 0 & 2 \\ -2 & 1 \end{pmatrix} \text{ and } (A^TA)^{-1} = \begin{pmatrix} 5/21 & 2/21 \\ 2/21 & 5/21 \end{pmatrix} \quad (3)$$

For example, a projection matrix, denoted P, from the 3D plane to the 2D plane may be determined, e.g., as follows:

$$\text{Projection Matrix } (P) = A(A^TA)^{-1}A^T = \begin{pmatrix} 5/21 & 4/21 & -8/21 \\ 4/21 & 20/21 & 2/21 \\ -8/21 & 2/21 & 5/21 \end{pmatrix} \quad (4)$$

In one example, it may be deduced that $p=p^T=p^2$ may satisfy properties of the projection matrix (P) of the 3D vector space.

In one example, the 2D point $\dot{D}$ may be defined as $(-2, -5, 0)$, and the potential 3D location $\vec{C}$ may be defined as $(x, y, z)$. According to this example, the difference vector $\vec{CD}$ from the 2D location vector $\vec{D}$ to the potential 3D location $\vec{C}$ may be determined as $\vec{CD}=(x+2, y+5, z)$.

For example, an error vector parallel to the normal vector $\vec{N}$ may be used to determine a z-axis value of the potential 3D location $\vec{C}$, e.g., as follows:

$$\vec{CD} - \vec{PCD} = K\vec{N}$$

$$\vec{CD}[1-P] \text{ and} \quad (5)$$

$$K = \vec{CD} \cdot \vec{N} \quad (6)$$

In one example, a projection, denoted $P^+$, on a null space of the 3D plane may be based, for example, on the projection matrix (P), e.g., as follows:

$$I = P + P^+ \quad (7)$$

$$P^+ = \begin{pmatrix} 1 & 0 & 0 \\ 0 & 1 & 0 \\ 0 & 0 & 1 \end{pmatrix} - \begin{pmatrix} 5/21 & 4/21 & -8/21 \\ 4/21 & 20/21 & 2/21 \\ -8/21 & 2/21 & 5/21 \end{pmatrix}$$

For example, the projection $P^+$ on the null space of the 3D plane may result in:

$$I-P=P^+=\begin{pmatrix} 16/21 & -4/21 & 8/21 \\ -4/21 & 1/21 & -2/21 \\ 8/21 & -2/21 & 16/21 \end{pmatrix} \quad (8)$$

For example, using Equation 6 and substituting the projection $P^+$ for points may result in:

$$d=\frac{\|\overrightarrow{CD}\cdot\vec{N}\|}{\|\vec{N}\|}=\frac{4x-y+2z+3}{\sqrt{21}}=\begin{pmatrix} 16/21 & -4/21 & 8/21 \\ -4/21 & 1/21 & -2/21 \\ 8/21 & -2/21 & 16/21 \end{pmatrix}\begin{pmatrix} x+2 \\ y+5 \\ z \end{pmatrix} \quad (9)$$

For example, substituting $x=-2$ and $y=-5$ in Equation 9, may allow to determine the z-axis value of the potential 3D location $\vec{C}$, e.g., as follows:

$$\frac{-10+2z}{\sqrt{21}}=\frac{16}{21}Z => z=-6.71$$

In some demonstrative embodiments, location mapper 102 may be configured to determine whether the potential 3D location may be used as the 3D location of the wireless communication device, for example, based on whether the potential 3D location is on the potential plane, e.g., as described below.

For example, location mapper 102 may determine whether the calculated value of z is on the potential plane for the wireless communication device 142.

In some demonstrative embodiments, location mapper 102 may be configured to determine another potential plane, for example, to determine the 3D location of the wireless communication device, for example, if the potential 3D location is not on the potential plane, e.g., as described below.

In some demonstrative embodiments, location mapper 102 may be configured to determine the 3D mapping of the 3D locations of the plurality of wireless communication devices 140, for example, by applying a localization algorithm to the plurality of 3D locations.

In some demonstrative embodiments, location mapper 102 may be configured to determine the 3D mapping of the 3D locations of the plurality of wireless communication devices 140, for example, by determining a 3D distance matrix, for example, based on the plurality of 3D locations, and applying an MDS algorithm to the 3D distance matrix.

Figure 3:
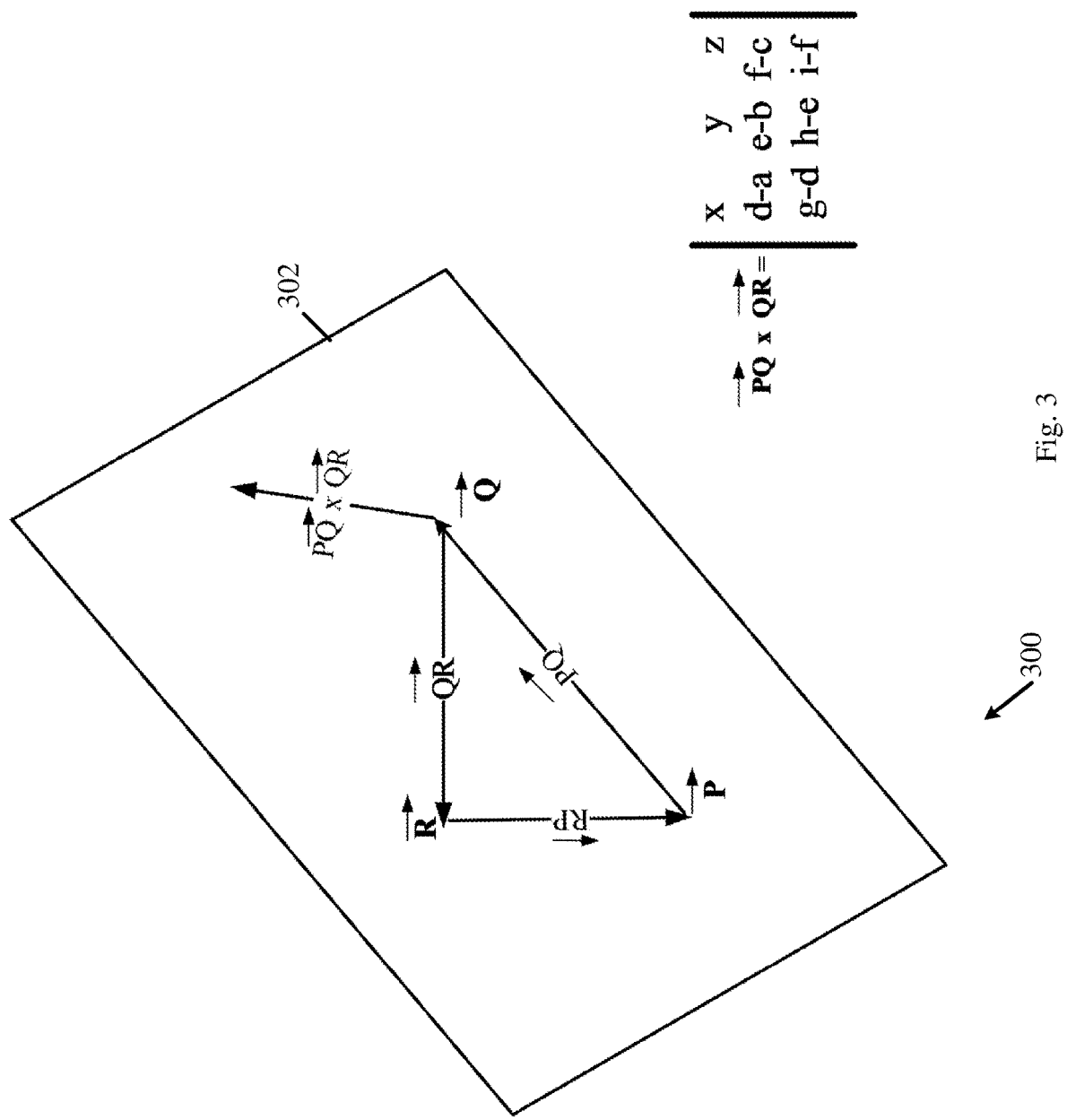
FIG. 3 is a schematic illustration of a projection scheme, in accordance with some demonstrative embodiments.

Reference is made to FIG. 3, which schematically illustrates a projection scheme 300, in accordance with some demonstrative embodiments.

In some demonstrative embodiments, a location processing device, e.g., location processing device 104 (FIG. 1), may be configured to perform one or more operations of projecting 3D location vectors to 2D location vectors and/or projecting 2D location vectors to 3D location vectors, for example, using projection scheme 300, e.g., as described below.

As shown in FIG. 3, projection scheme 300 depicts position vectors of three points, denoted $P=P(a, b, c)$, $Q=Q(d, e, f)$, and $R=R(g, h, i)$.

In some demonstrative embodiments, the three points may be validated for non-collinearity of the three points, e.g., as described below.

In one example, a 3D vector representation of the coordinates of the three points may be defined, for example, when a plane of a location server, e.g., the plane of location processing device 104 (FIG. 1), may be used as a reference.

In some demonstrative embodiments, location mapper 102 (FIG. 1) may be configured to determine whether a first vector $\overrightarrow{PQ}$ between the points P and Q, and a second vector, $\overrightarrow{QR}$ between the points Q and R, are non-collinear, e.g., as described below.

For example, the vectors $\overrightarrow{PQ}$ and $\overrightarrow{QR}$ may be defined, e.g., as follows:

$$\overrightarrow{PQ}=\vec{Q}-\vec{P}=\{d-a,e-b,f-c\}$$

$$\overrightarrow{QR}=\vec{R}-\vec{Q}=\{g-d,h-e,i-f\} \quad (10)$$

In some demonstrative embodiments, the vectors $\overrightarrow{PQ}$ and $\overrightarrow{QR}$ may be collinear, for example, if one of the vectors is a scalar multiple of the other one. Otherwise the vectors $\overrightarrow{PQ}$ and $\overrightarrow{QR}$ may be determined to be non-collinear vectors.

In some demonstrative embodiments, a vector space 302 (also referred to as "plane V"), e.g., a 2D vector space, may be created by the vectors $\overrightarrow{PQ}$ and $\overrightarrow{QR}$, e.g., when the vectors $\overrightarrow{PQ}$ and $\overrightarrow{QR}$ are non-collinear.

In some demonstrative embodiments, the vectors $\overrightarrow{PQ}$ and $\overrightarrow{QR}$ may be a basis for a spanned plane, denoted "A". For example, for a vector space V where the two non-collinear vectors $\overrightarrow{PQ}\in V$ and $\overrightarrow{QR}\in V$, then the vectors $\overrightarrow{PQ}$ and $\overrightarrow{QR}$ may be a basis of $A=\text{Span}(\overrightarrow{PQ}, \overrightarrow{QR})$.

In some demonstrative embodiments, the spanned plane A may be used to project a 3D plane to a 2D plane and/or to project a 2D plane to a 3D plane, e.g., as described below.

In some demonstrative embodiments, vectors forming a 3D plane may be projected to a 2D map, which may include a subspace $\vec{V}\in R^3$, e.g., when the projection is done.

In some demonstrative embodiments, the vectors $\overrightarrow{PQ}$ and $\overrightarrow{QR}$ may be projected on the 2D plane, e.g., as follows:

$$\text{Projection}(\overrightarrow{PQ})=\{A(A^TA)^{-1}A^T\}\overrightarrow{PQ}$$

$$\text{Projection}(\overrightarrow{QR})=\{A(A^TA)^{-1}A^T\}\overrightarrow{QR} \quad (11)$$

In some demonstrative embodiments, the projected vectors on the 2D plane may be defined, e.g., as follows:

$$\vec{PQ}=\text{Projection}(\overrightarrow{PQ})$$

$$\vec{PQ}=\text{Projection}(\overrightarrow{QR}) \quad (12)$$

In some demonstrative embodiments, the projected vectors may form a basis for a 2D subspace and/or a projection for MDS coordinates.

In some demonstrative embodiments, a 3D mesh may be projected, for example, by using 2D coordinates of the subspace V, for example, to form 3D coordinates, e.g., as follows:

$$\overrightarrow{PQ}=\vec{PQ}+\vec{Z} \text{ Where } \vec{Z}\in\text{Orthogonal subspace of } \vec{V}$$

$$\overrightarrow{QR}=\vec{PQ}+\vec{Z} \text{ Where } \vec{Z}\in\text{Orthogonal subspace of } \vec{V} \quad (13)$$

Figure 4:
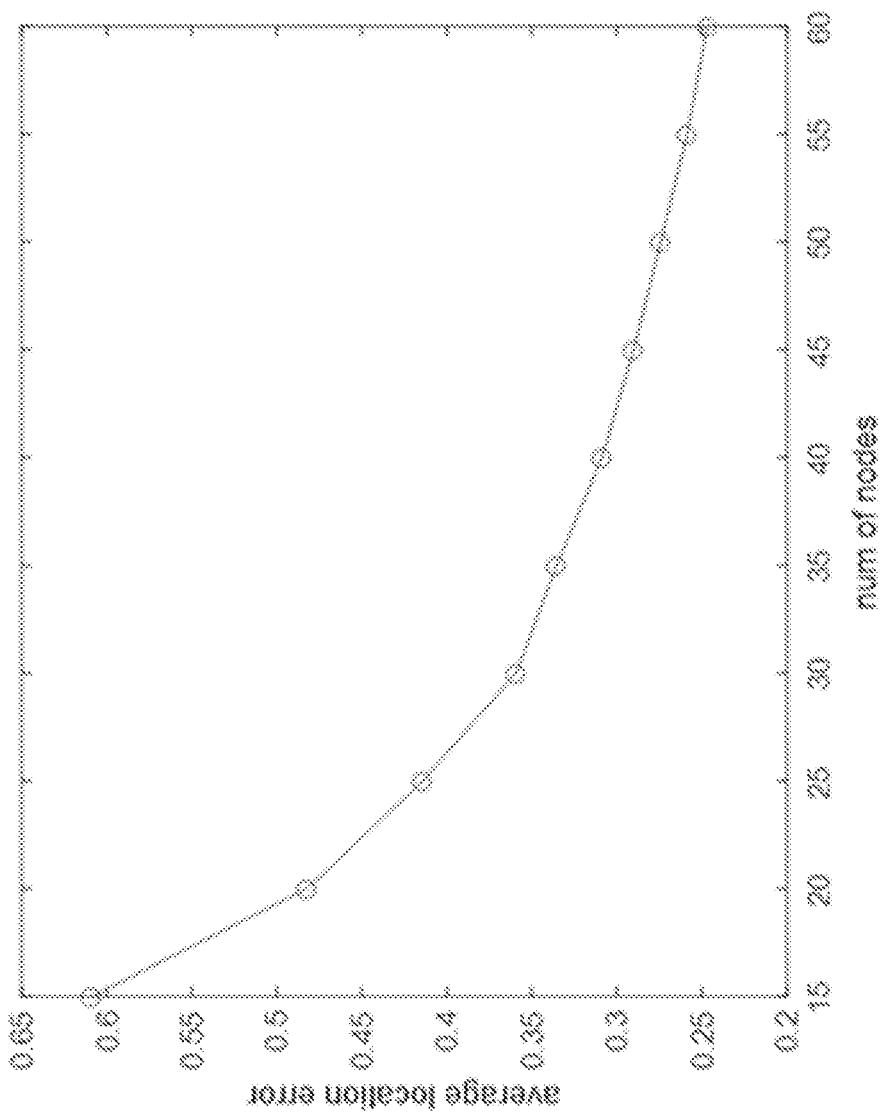
FIG. 4 is a schematic illustration of graph depicting an average location error versus a number of nodes, in accordance with some demonstrative embodiments.

Reference is made to FIG. 4, which schematically illustrates a graph 400 depicting an average location error versus a number of nodes, in accordance with some demonstrative embodiments.

In one example, data points of graph 400 may be based on simulation results of one or more of the location information processing techniques described herein, for example, for generating 3D-2D map statistics, e.g., with more subtle location accuracy.

The simulation results of FIG. 4 are based on a fully connected network with N nodes e.g., uniformly and/or randomly distributed, in a 50 m×50 m area.

For example, a standard deviation of a range measurement error may be less than one meter, and the error may follow zero-mean Gaussian distribution.

For example, as shown in FIG. 4, graph 400 depicts an average node location accuracy, e.g., with a different number of nodes in the area.

In For example, each data point in graph 400 may be averaged, e.g., from 100 random experiments.

For example, it may be assumed that full set of pair-wise range measurements is performed, for example, between each pair of nodes e.g. such that the number of measurements is:

$$\text{num\_measurements} = \text{num\_nodes} * (\text{num\_nodes} - 1)/2. \quad (14)$$

For example, an average node metric may be based on a predefined number of nodes, e.g., on a number of nodes >=12, or any other number, e.g., for stability of a non-metric MDS.

In one example, the error may represent a relative node topology error if coordinate translation and/or rotation between MDS results and true location is not to be considered.

Figure 5:
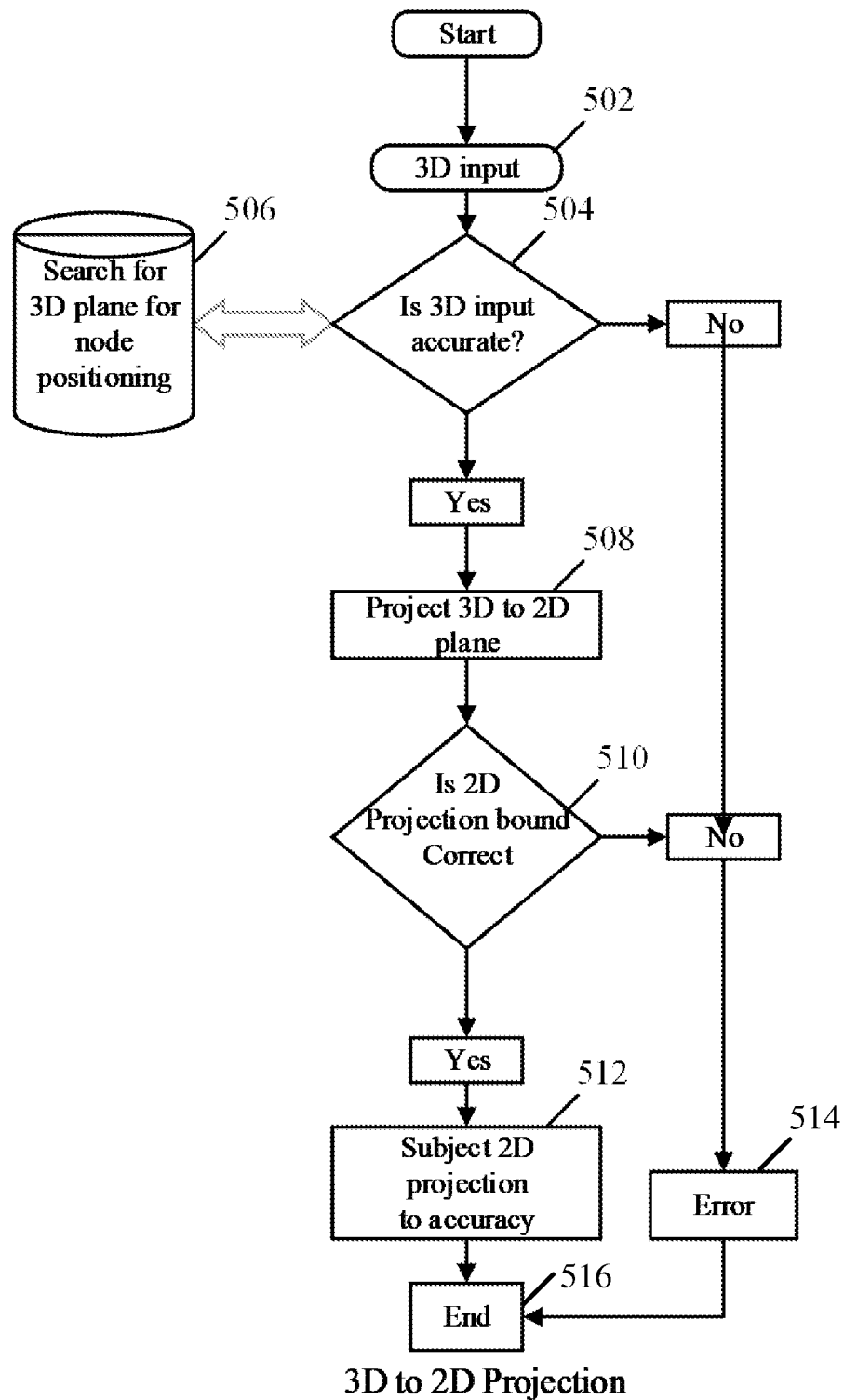
FIG. 5 is a schematic flow-chart illustration of a method of projection of three-dimensional (3D) location vectors to a two-dimensional (2D) plane, in accordance with some demonstrative embodiments.

Reference is made to FIG. 5, which schematically illustrates a method of projection of 3D location vectors to a 2D plane, in accordance with some demonstrative embodiments. For example, one or more of the operations of the method of FIG. 5 may be performed by one or more elements of a system, e.g., system 100 (FIG. 1), for example, a computing system, e.g., location processing device 104 (FIG. 1), a processor, e.g., processor 185 (FIG. 1), and/or a location mapper, e.g., location mapper 102 (FIG. 1).

As indicated at block 502, the method may include processing a 3D point of a wireless node. For example, location mapper 102 (FIG. 1) may process 3D coordinates of a wireless node 140 (FIG. 1), e.g., as described above.

In one example, the location mapper may receive 3D coordinates of a point, for example, after performing pair-wise distance measurements with other wireless nodes, e.g., using an RSSI measurement, a ToF measurement, a Triangulation measurement and/or any other positioning measurement, for example, to determine 3D coordinates of the wireless node.

As indicated at block 504, the method may include determining an accuracy of the 3D point. For example, location mapper 102 (FIG. 1) may determine the accuracy of the 3D point.

For example, the three coordinates of the wireless node may be subjected to MDS, for example, to improve an accuracy of location error in a 3D plane, e.g., as described above.

As indicated at block 506, the method may include searching for a potential 3D plane to be used determine the wireless node positioning. For example, location mapper 102 (FIG. 1) may search for a 3D plane to determine the node positioning, e.g., as described above.

As indicated at block 508, the method may include projecting the 3D point to a 2D plane, for example, when the 3D point is determined to be accurate.

For example, after identifying the node, for example, using a Layer 2 identity scheme, e.g., a MAC address, the location mapper may perform 3D to 2D conversion, for example, by dropping a z-axis value, which is associating the wireless node to the 3D plane, e.g., as described above.

As indicated at block 510, the method may include determining whether a 2D point projection of the 3D point to the 2D plane is within bounds of a map.

In one example, if the location mapper determines that the 2D point projection is in a plane defined by a central node, e.g., the location mapper, for the wireless node, then the location mapper may project the 3D point, for example, by dropping the z-axis coordinates of the map.

In some demonstrative embodiments, the central node may also determine an authenticity of the 2D point, for example, by subjecting a 2D position to be in the bound given by projection on a null space of a 3D plane, e.g., as described above.

As indicated at block 512, the method may include applying a localization algorithm, e.g., an MDS algorithm, for example, to improve an accuracy of the 2D point, for example, when the 2D point is within the predefined bounds of the map.

For example, when the 3D point satisfies a plane equation, e.g., of the plane, a location accuracy of the wireless node may be validated, for example, by applying MDS on the 3D point.

As indicated at block 514, for example, if coordinates of the 3D point do not satisfy the equation of the plane, the method may include searching for another normal plane definition, e.g., to identify a location of the wireless node, for example, if such a plane exists in an estimated location of the wireless node.

As indicated at block 516, if none of the plane searches satisfies any plane definitions for the wireless node, the method may include ending process by determining that the wireless node is not in the bounds of the map.

Figure 6:
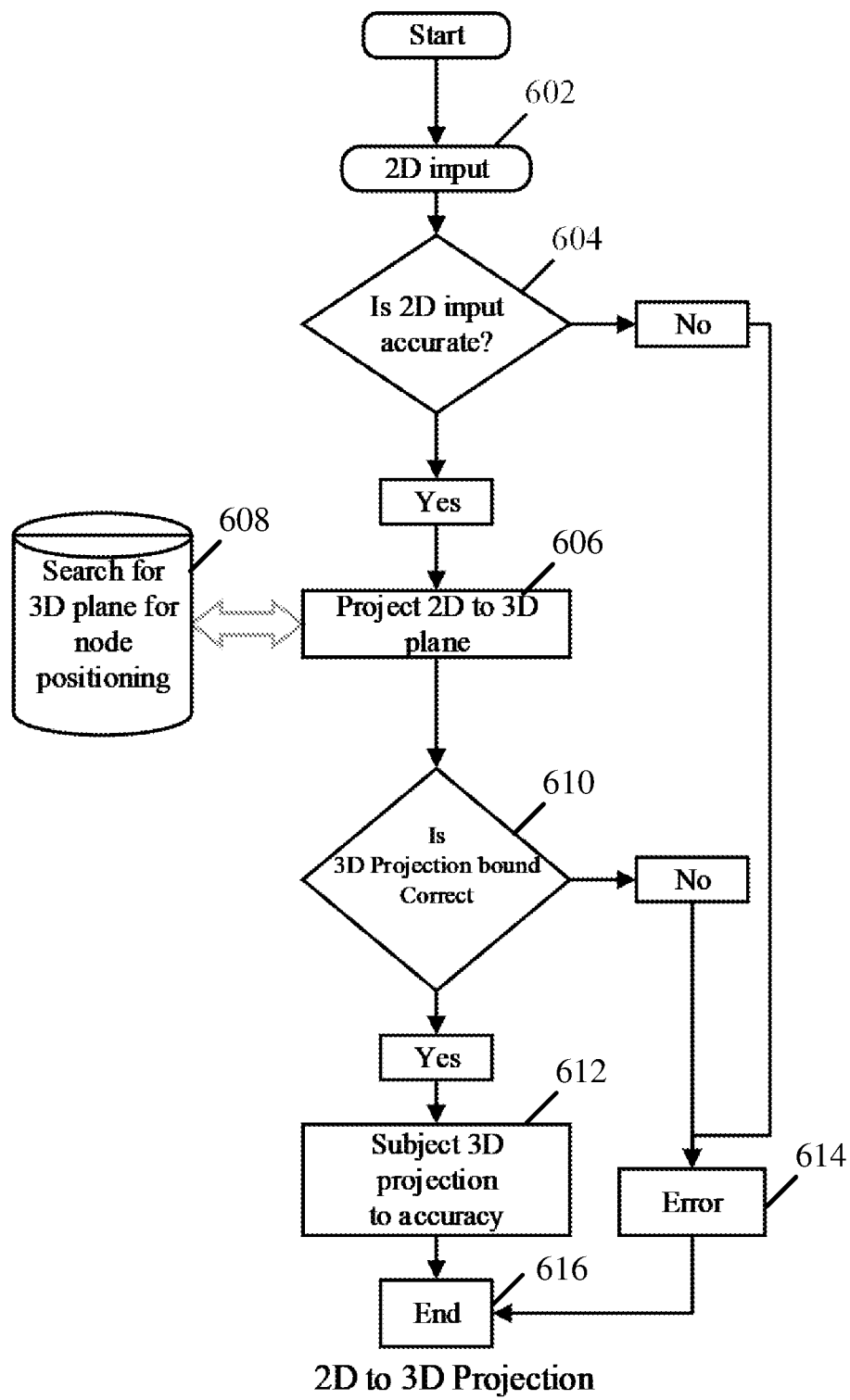
FIG. 6 is a schematic flow-chart illustration of a method of projection of 2D location vectors to a 3D plane, in accordance with some demonstrative embodiments.

Reference is made to FIG. 6, which schematically illustrates a method of projection of 2D location vectors to a 3D plane, in accordance with some demonstrative embodiments. For example, one or more of the operations of the method of FIG. 6 may be performed by one or more elements of a system, e.g., system 100 (FIG. 1), for example, a computing system, e.g., location processing device 104 (FIG. 1), a processor, e.g., processor 185 (FIG. 1), and/or a location mapper, e.g., location mapper 102 (FIG. 1).

As indicated at block 602, the method may include processing a 2D point of a wireless node. For example, location mapper 102 (FIG. 1) may process 2D coordinates of a wireless node 140 (FIG. 1), e.g., as described above.

In one example, the location mapper 102 (FIG. 1) may receive 2D coordinates of a point, for example, after performing pair-wise distance measurements with other wireless nodes, e.g., using an RSSI measurement, a ToF measurement, a Triangulation measurement, and/or any other positioning measurement, for example, to determine 2D coordinates of the wireless node.

As indicated at block 604, the method may include determining an accuracy of the 2D point. For example, location mapper 102 (FIG. 1) may determine the accuracy of the 2D point.

For example, the 2D coordinates of the wireless node may be subjected to MDS, for example, to improve an accuracy of location error in a 2D plane, e.g., as described above.

As indicated at block 606, the method may include projecting the 2D point to a 3D plane, for example, when the 2D point is determined to be accurate.

As indicated at block 608, the method may include searching for a potential 3D plane to determine the wireless node positioning. For example, location mapper 102 (FIG. 1) may search for a potential 3D plane to determine the node positioning, e.g., as described above.

As indicated at block 610, the method may include determining whether a 3D point projection of the 2D point to the 3D plane is correct.

For example, after identifying the wireless node, for example, using a Layer 2 identity scheme, e.g., a MAC address, the location mapper 102 (FIG. 1) may perform a 2D projection to the potential 3D plane, which is associated with the wireless node, for example, to determine the 3D coordinates in that plane.

In one example, if the location mapper 102 (FIG. 1) determines that the 3D point projection is in the potential 3D plane defined for the wireless node, the location mapper 102 (FIG. 1) may project the 2D point on a 3D map, for example, to locate the wireless node, e.g., as described above.

In some demonstrative embodiments, an authenticity of the 2D point may be determined, for example, by subjecting a 2D position to be in the bound given by projection on null space of a 3D plane, e.g., as described above.

As indicated at block 612, the method may include performing an MDS algorithm to increase accuracy, for example, when the 3D point is determined to be within the bounds of the map.

For example, when the 3D point satisfies the plane equation of the potential plane, location accuracy of the wireless node may be validated, for example, by applying MDS on the 3D point.

As indicated at block 614, if coordinates of the 3D point do not satisfy the equation of the plane, another normal plane definition may be searched, e.g., to identify a location of the wireless node, for example, if such a plane exists in an estimated location of the wireless node.

As indicated at block 616, if no normal plane definition satisfies any plane definitions for the wireless node, the method may include ending the process by determining that the wireless node is not in the bounds of the map.

Figure 7:
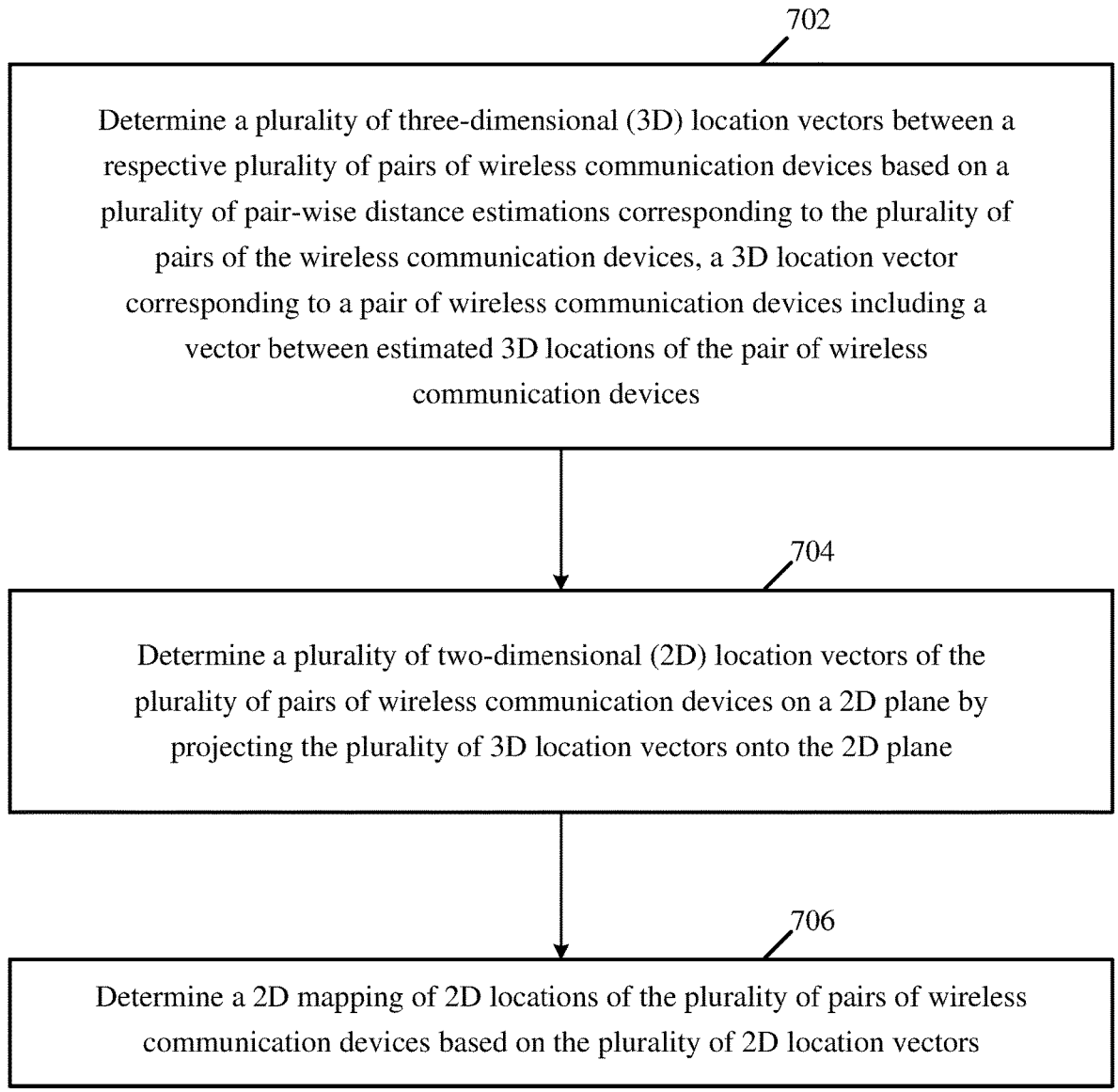
FIG. 7 is a schematic flow-chart illustration of a method of location mapping, in accordance with some demonstrative embodiments.

Reference is made to FIG. 7, which schematically illustrates a method of location mapping. For example, one or more of the operations of the method of FIG. 7 may be performed by one or more elements of a system, e.g., system 100 (FIG. 1), for example, a computing system, e.g., location processing device 104 (FIG. 1), a processor, e.g., processor 185 (FIG. 1), and/or a location mapper, e.g., location mapper 102 (FIG. 1).

As indicated at block 702, the method may include determining a plurality of 3D location vectors between a respective plurality of pairs of wireless communication devices based on a plurality of pair-wise distance estimations corresponding to the plurality of pairs of the wireless communication devices, a 3D location vector corresponding to a pair of wireless communication devices including a vector between estimated 3D locations of the pair of wireless communication devices. For example, location mapper 102 (FIG. 1) may determine the plurality of 3D location vectors between the respective plurality of pairs of wireless communication device 140 (FIG. 1) based on the plurality of pair-wise distance estimations corresponding to the plurality of pairs of the wireless communication devices 140 (FIG. 1). For example, the 3D location vector corresponding to the pair of wireless communication devices 142 and 144 (FIG. 1) may include the vector between the estimated 3D locations of the pair of wireless communication devices 142 and 144 (FIG. 1), e.g., as described above.

As indicated at block 704, the method may include determining a plurality of 2D location vectors of the plurality of pairs of wireless communication devices on a 2D plane by projecting the plurality of 3D location vectors onto the 2D plane. For example, location mapper 102 (FIG. 1) may determine the plurality of 2D location vectors of the plurality of pairs of wireless communication devices 140 (FIG. 1) on a 2D plane by projecting the plurality of 3D location vectors onto the 2D plane, e.g., as described above.

As indicated at block 706, the method may include determining a 2D mapping of 2D locations of the plurality of pairs of wireless communication devices based on the plurality of 2D location vectors. For example, location mapper 102 (FIG. 1) may determine the 2D mapping of 2D locations of the plurality of pairs of wireless communication devices 140 (FIG. 1) based on the plurality of 2D location vectors, e.g., as described above.

Figure 8:
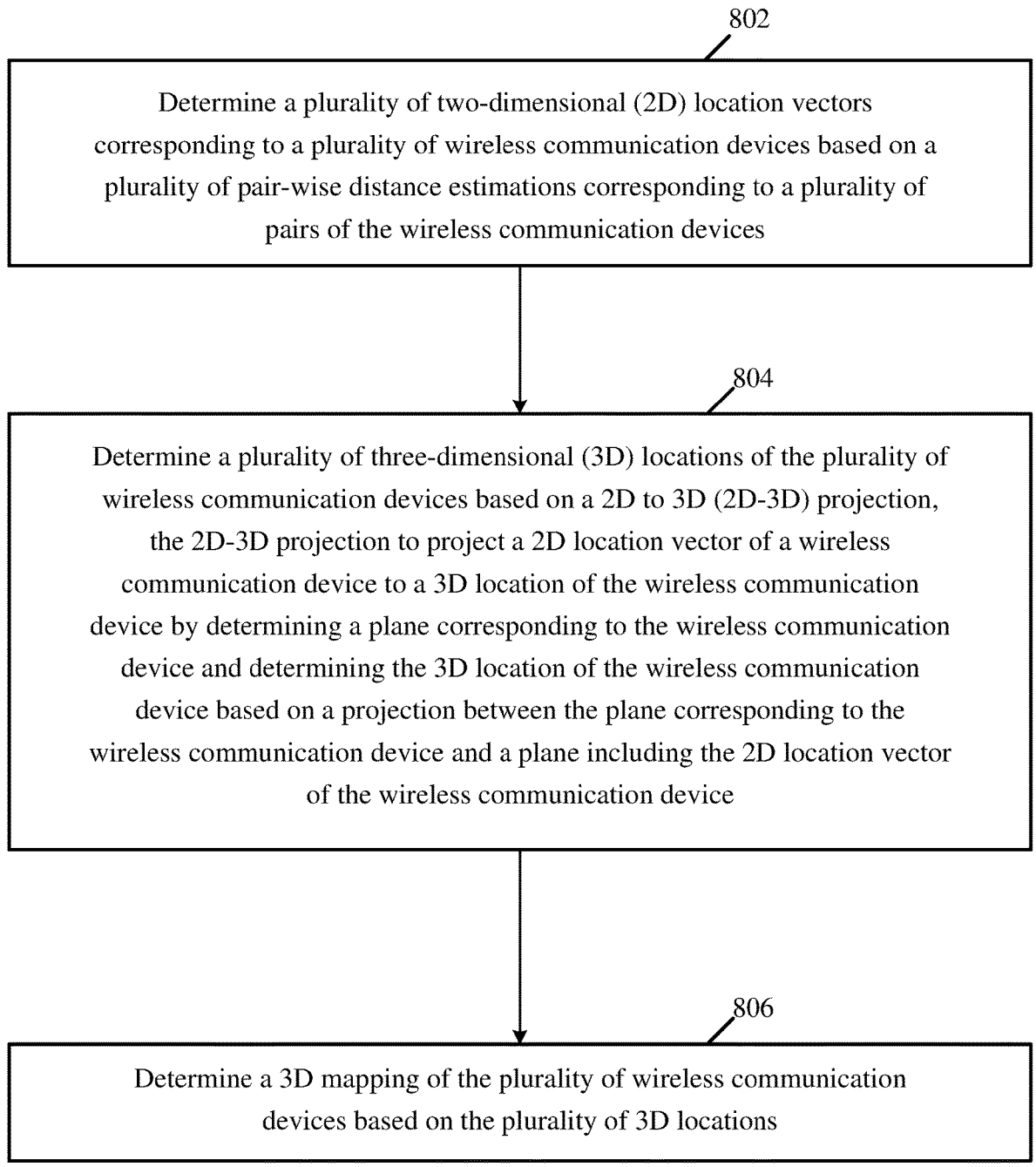
FIG. 8 is a schematic flow-chart illustration of a method of location mapping, in accordance with some demonstrative embodiments.

Reference is made to FIG. 8, which schematically illustrates a method of location mapping. For example, one or more of the operations of the method of FIG. 8 may be performed by one or more elements of a system, e.g., system 100 (FIG. 1), for example, a computing system, e.g., location processing device 104 (FIG. 1), a processor, e.g., processor 185 (FIG. 1), and/or a location mapper, e.g., location mapper 102 (FIG. 1).

As indicated at block 802, the method may include determining a plurality of 2D location vectors corresponding to a plurality of wireless communication devices based on a plurality of pair-wise distance estimations corresponding to a plurality of pairs of the wireless communication devices. For example, location mapper 102 (FIG. 1) may determine the plurality of 2D location vectors corresponding to the plurality of wireless communication devices 140 (FIG. 1) based on the plurality of pair-wise distance estimations corresponding to the plurality of pairs of the wireless communication devices 140 (FIG. 1), e.g., as described above.

As indicated at block 804, the method may include determining a plurality of 3D locations of the plurality of wireless communication devices based on a 2D-3D projection, which is to project a 2D location vector of a wireless communication device to a 3D location of the wireless communication device by determining a plane corresponding to the wireless communication device and determining the 3D location of the wireless communication device based on a projection between the plane corresponding to the wireless communication device and a plane including the 2D location vector of the wireless communication device. For example, location mapper 102 (FIG. 1) may determine the plurality of 3D locations of the plurality of wireless communication devices 140 (FIG. 1) based on a 2D-3D projection, which is to project the 2D location vector of wireless communication device 142 (FIG. 1) to the 3D location of the wireless communication device 142 (FIG. 1) by determining the plane corresponding to the wireless communication device 142 (FIG. 1) and determining the 3D location of the wireless communication device 142 (FIG. 1) based on the projection between the plane corresponding to the wireless communication device and the plane including the 2D location vector of the wireless communication device 142 (FIG. 1), e.g., as described above.

As indicated at block 806, the method may include determining a 3D mapping of 3D locations of the plurality of wireless communication devices based on the plurality of 3D location vectors. For example, location mapper 102 (FIG. 1) may determine the 3D mapping of the 3D locations of the plurality of wireless communication devices 140 (FIG. 1) based on the plurality of 3D location vectors, e.g., as described above.

Figure 9:
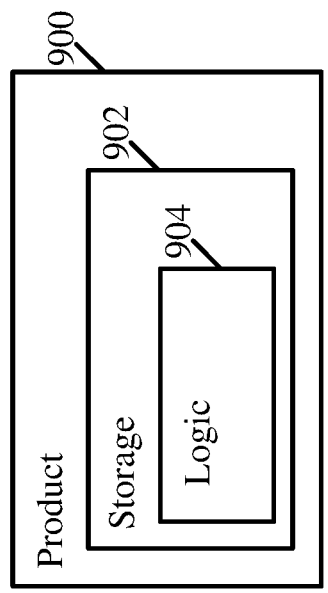
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at location processing device 104 (FIG. 1), processor 185 (FIG. 1), location mapper 102 (FIG. 1), and/or positioning component 117 (FIG. 1), to cause location processing device 104 (FIG. 1), processor 185 (FIG. 1), location mapper 102 (FIG. 1), and/or positioning component 117 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, and/or 8, and/or one or more operations described herein. The phrases "non-transitory machine-readable medium" and "computer-readable non-transitory storage media" are directed to include all computer-readable media, with the sole exception being a transitory propagating signal.

In some demonstrative embodiments, product 900 and/or machine-readable storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a product comprising one or more tangible computer-readable non-transitory storage media comprising computer-executable instructions operable to, when executed by at least one processor, enable the at least one processor to cause a location processing device to determine a plurality of three-dimensional (3D) location vectors between a respective plurality of pairs of wireless communication devices based on a plurality of pair-wise distance estimations corresponding to the plurality of pairs of the wireless communication devices, a 3D location vector corresponding to a pair of wireless communication devices comprising a vector between estimated 3D locations of the pair of wireless communication devices; determine a plurality of two-dimensional (2D) location vectors of the plurality of pairs of wireless communication devices on a 2D plane by projecting the plurality of 3D location vectors onto the 2D plane; and determine a 2D mapping of 2D locations of the plurality of pairs of wireless communication devices based on the plurality of 2D location vectors.

Example 2 includes the subject matter of Example 1, and optionally, wherein the instructions, when executed, cause the location processing device to determine a spanned plane, which is spanned by a first 3D location vector and a second 3D location vector, the first 3D location vector between estimated 3D locations of a first wireless communication device and a second wireless communication device, the second 3D location vector between estimated 3D locations of the second wireless communication device and a third wireless communication device; to determine a first 2D location vector between the first wireless communication device and the second wireless communication device by projecting the first 3D location vector from the spanned plane to the 2D plane; and to determine a second 2D location vector between the second wireless communication device and the third wireless communication device by projecting the second 3D location vector from the spanned plane to the 2D plane.

Example 3 includes the subject matter of Example 2, and optionally, wherein the instructions, when executed, cause the location processing device to determine the first 2D location vector by applying to the first 3D location vector a projection $\{A(A^TA)^{-1}A^T\}$, and to determine the second 2D location vector by applying to the second 3D location vector the projection $\{A(A^TA)^{-1}A^T\}$, wherein A denotes a span of the first and second 3D location vectors.

Example 4 includes the subject matter of Example 2 or 3, and optionally, wherein the instructions, when executed, cause the location processing device to select the first and second 3D location vectors from the plurality of 3D location vectors based on a determination that the first and second 3D location vectors are non-collinear.

Example 5 includes the subject matter of any one of Examples 1-4, and optionally, wherein the instructions, when executed, cause the location processing device to determine the plurality of 3D location vectors by applying a localization algorithm to the plurality of pair-wise distance estimations.

Example 6 includes the subject matter of any one of Examples 1-5, and optionally, wherein the instructions, when executed, cause the location processing device to determine the plurality of 3D location vectors by determining a 3D distance matrix based on the plurality of pair-wise distance estimations, and applying a Multi-Dimensional Scaling (MDS) algorithm to the 3D distance matrix.

Example 7 includes the subject matter of any one of Examples 1-6, and optionally, wherein the instructions, when executed, cause the location processing device to determine the 2D mapping of the 2D locations of the plurality of pairs of wireless communication devices by applying a localization algorithm to the plurality of 2D location vectors.

Example 8 includes the subject matter of any one of Examples 1-7, and optionally, wherein the instructions, when executed, cause the location processing device to determine the 2D mapping of the 2D locations of the plurality of pairs of wireless communication devices by determining a 2D distance matrix based on the plurality of 2D location vectors, and applying a Multi-Dimensional Scaling (MDS) algorithm to the 2D distance matrix.

Example 9 includes the subject matter of any one of Examples 1-8, and optionally, wherein a pair-wise distance estimation corresponding to the pair of the wireless communication devices is based on one or more measurements of wireless communication signals between the pair of the wireless communication devices.

Example 10 includes the subject matter of any one of Examples 1-9, and optionally, wherein a pair-wise distance estimation corresponding to the pair of the wireless communication devices comprises at least one of a Time of Flight (ToF) estimation, a Received Signal Strength Indicator (RSSI) estimation, or an Angle of Arrival (AoA) estimation.

Example 11 includes the subject matter of any one of Examples 1-10, and optionally, wherein at least one pair of the plurality of pairs of wireless communication devices comprises the location processing device, the instructions, when executed cause the location processing device to determine at least one pair-wise distance estimation corresponding to the at least one pair.

Example 12 includes a method of location mapping comprising determining a plurality of three-dimensional (3D) location vectors between a respective plurality of pairs of wireless communication devices based on a plurality of pair-wise distance estimations corresponding to the plurality of pairs of the wireless communication devices, a 3D location vector corresponding to a pair of wireless communication devices comprising a vector between estimated 3D locations of the pair of wireless communication devices; determining a plurality of two-dimensional (2D) location vectors of the plurality of pairs of wireless communication devices on a 2D plane by projecting the plurality of 3D location vectors onto the 2D plane; and determining a 2D mapping of 2D locations of the plurality of pairs of wireless communication devices based on the plurality of 2D location vectors.

Example 13 includes the subject matter of Example 12, and optionally, comprising determining a spanned plane, which is spanned by a first 3D location vector and a second 3D location vector, the first 3D location vector between estimated 3D locations of a first wireless communication device and a second wireless communication device, the second 3D location vector between estimated 3D locations of the second wireless communication device and a third wireless communication device; determining a first 2D location vector between the first wireless communication device and the second wireless communication device by projecting the first 3D location vector from the spanned plane to the 2D plane; and determining a second 2D location vector between the second wireless communication device and the third wireless communication device by projecting the second 3D location vector from the spanned plane to the 2D plane.

Example 14 includes the subject matter of Example 13, and optionally, comprising determining the first 2D location vector by applying to the first 3D location vector a projection $\{A(A^TA)^{-1}A^T\}$, and determining the second 2D location vector by applying to the second 3D location vector the projection $\{A(A^TA)^{-1}A^T\}$, wherein A denotes a span of the first and second 3D location vectors.

Example 15 includes the subject matter of Example 13 or 14, and optionally, comprising selecting the first and second 3D location vectors from the plurality of 3D location vectors based on a determination that the first and second 3D location vectors are non-collinear.

Example 16 includes the subject matter of any one of Examples 12-15, and optionally, comprising determining the plurality of 3D location vectors by applying a localization algorithm to the plurality of pair-wise distance estimations.

Example 17 includes the subject matter of any one of Examples 12-16, and optionally, comprising determining the plurality of 3D location vectors by determining a 3D distance matrix based on the plurality of pair-wise distance estimations, and applying a Multi-Dimensional Scaling (MDS) algorithm to the 3D distance matrix.

Example 18 includes the subject matter of any one of Examples 12-17, and optionally, comprising determining the 2D mapping of the 2D locations of the plurality of pairs of wireless communication devices by applying a localization algorithm to the plurality of 2D location vectors.

Example 19 includes the subject matter of any one of Examples 12-18, and optionally, comprising determining the 2D mapping of the 2D locations of the plurality of pairs of wireless communication devices by determining a 2D distance matrix based on the plurality of 2D location vectors, and applying a Multi-Dimensional Scaling (MDS) algorithm to the 2D distance matrix.

Example 20 includes the subject matter of any one of Examples 12-19, and optionally, wherein a pair-wise distance estimation corresponding to the pair of the wireless communication devices is based on one or more measurements of wireless communication signals between the pair of the wireless communication devices.

Example 21 includes the subject matter of any one of Examples 12-20, and optionally, wherein a pair-wise distance estimation corresponding to the pair of the wireless communication devices comprises at least one of a Time of Flight (ToF) estimation, a Received Signal Strength Indicator (RSSI) estimation, or an Angle of Arrival (AoA) estimation.

Example 22 includes the subject matter of any one of Examples 12-21, and optionally, wherein at least one pair of the plurality of pairs of wireless communication devices comprises a location processing device to perform the method, the method comprising determining at least one pair-wise distance estimation corresponding to the at least one pair.

Example 23 includes an apparatus of location mapping comprising means for determining a plurality of three-dimensional (3D) location vectors between a respective plurality of pairs of wireless communication devices based on a plurality of pair-wise distance estimations corresponding to the plurality of pairs of the wireless communication devices, a 3D location vector corresponding to a pair of wireless communication devices comprising a vector between estimated 3D locations of the pair of wireless communication devices; means for determining a plurality of two-dimensional (2D) location vectors of the plurality of pairs of wireless communication devices on a 2D plane by projecting the plurality of 3D location vectors onto the 2D plane; and means for determining a 2D mapping of 2D locations of the plurality of pairs of wireless communication devices based on the plurality of 2D location vectors.

Example 24 includes the subject matter of Example 23, and optionally, comprising means for determining a spanned plane, which is spanned by a first 3D location vector and a second 3D location vector, the first 3D location vector between estimated 3D locations of a first wireless communication device and a second wireless communication device, the second 3D location vector between estimated 3D locations of the second wireless communication device and a third wireless communication device; determining a first 2D location vector between the first wireless communication device and the second wireless communication device by projecting the first 3D location vector from the spanned plane to the 2D plane; and determining a second 2D location vector between the second wireless communication device and the third wireless communication device by projecting the second 3D location vector from the spanned plane to the 2D plane.

Example 25 includes the subject matter of Example 24, and optionally, comprising means for determining the first 2D location vector by applying to the first 3D location vector a projection $\{A(A^TA)^{-1}A^T\}$, and determining the second 2D location vector by applying to the second 3D location vector the projection $\{A(A^TA)^{-1}A^T\}$, wherein A denotes a span of the first and second 3D location vectors.

Example 26 includes the subject matter of Example 24 or 25, and optionally, comprising means for selecting the first and second 3D location vectors from the plurality of 3D location vectors based on a determination that the first and second 3D location vectors are non-collinear.

Example 27 includes the subject matter of any one of Examples 23-26, and optionally, comprising means for determining the plurality of 3D location vectors by applying a localization algorithm to the plurality of pair-wise distance estimations.

Example 28 includes the subject matter of any one of Examples 23-27, and optionally, comprising means for determining the plurality of 3D location vectors by determining a 3D distance matrix based on the plurality of pair-wise distance estimations, and applying a Multi-Dimensional Scaling (MDS) algorithm to the 3D distance matrix.

Example 29 includes the subject matter of any one of Examples 23-28, and optionally, comprising means for determining the 2D mapping of the 2D locations of the plurality of pairs of wireless communication devices by applying a localization algorithm to the plurality of 2D location vectors.

Example 30 includes the subject matter of any one of Examples 23-29, and optionally, comprising means for determining the 2D mapping of the 2D locations of the plurality of pairs of wireless communication devices by determining a 2D distance matrix based on the plurality of 2D location vectors, and applying a Multi-Dimensional Scaling (MDS) algorithm to the 2D distance matrix.

Example 31 includes the subject matter of any one of Examples 23-30, and optionally, wherein a pair-wise distance estimation corresponding to the pair of the wireless communication devices is based on one or more measurements of wireless communication signals between the pair of the wireless communication devices.

Example 32 includes the subject matter of any one of Examples 23-31, and optionally, wherein a pair-wise distance estimation corresponding to the pair of the wireless communication devices comprises at least one of a Time of Flight (ToF) estimation, a Received Signal Strength Indicator (RSSI) estimation, or an Angle of Arrival (AoA) estimation.

Example 33 includes the subject matter of any one of Examples 23-32, and optionally, wherein at least one pair of the plurality of pairs of wireless communication devices comprises a location processing device comprising the apparatus, the apparatus comprising means for determining at least one pair-wise distance estimation corresponding to the at least one pair.

Example 34 includes a location processing device comprising a network interface to communicate via a communication network; a memory having stored thereon instructions; and a processor to execute the instructions, the instructions, when executed by the processor, to result in a location mapper configured to determine a plurality of three-dimensional (3D) location vectors between a respective plurality of pairs of wireless communication devices based on a plurality of pair-wise distance estimations corresponding to the plurality of pairs of the wireless communication devices, a 3D location vector corresponding to a pair of wireless communication devices comprising a vector between estimated 3D locations of the pair of wireless communication devices; determine a plurality of two-dimensional (2D) location vectors of the plurality of pairs of wireless communication devices on a 2D plane by projecting the plurality of 3D location vectors onto the 2D plane; and determine a 2D mapping of 2D locations of the plurality of pairs of wireless communication devices based on the plurality of 2D location vectors.

Example 35 includes the subject matter of Example 34, and optionally, wherein the instructions, when executed, cause the location mapper to determine a spanned plane, which is spanned by a first 3D location vector and a second 3D location vector, the first 3D location vector between estimated 3D locations of a first wireless communication device and a second wireless communication device, the second 3D location vector between estimated 3D locations of the second wireless communication device and a third wireless communication device; to determine a first 2D location vector between the first wireless communication device and the second wireless communication device by projecting the first 3D location vector from the spanned plane to the 2D plane; and to determine a second 2D location vector between the second wireless communication device and the third wireless communication device by projecting the second 3D location vector from the spanned plane to the 2D plane.

Example 36 includes the subject matter of Example 35, and optionally, wherein the instructions, when executed, cause the location mapper to determine the first 2D location vector by applying to the first 3D location vector a projection $\{A(A^TA)^{-1}A^T\}$, and to determine the second 2D location vector by applying to the second 3D location vector the projection $\{A(A^TA)^{-1}A^T\}$, wherein A denotes a span of the first and second 3D location vectors.

Example 37 includes the subject matter of Example 35 or 36, and optionally, wherein the instructions, when executed, cause the location mapper to select the first and second 3D location vectors from the plurality of 3D location vectors based on a determination that the first and second 3D location vectors are non-collinear.

Example 38 includes the subject matter of any one of Examples 34-37, and optionally, wherein the instructions, when executed, cause the location mapper to determine the plurality of 3D location vectors by applying a localization algorithm to the plurality of pair-wise distance estimations.

Example 39 includes the subject matter of any one of Examples 34-38, and optionally, wherein the instructions, when executed, cause the location mapper to determine the plurality of 3D location vectors by determining a 3D distance matrix based on the plurality of pair-wise distance estimations, and applying a Multi-Dimensional Scaling (MDS) algorithm to the 3D distance matrix.

Example 40 includes the subject matter of any one of Examples 34-39, and optionally, wherein the instructions, when executed, cause the location mapper to determine the 2D mapping of the 2D locations of the plurality of pairs of wireless communication devices by applying a localization algorithm to the plurality of 2D location vectors.

Example 41 includes the subject matter of any one of Examples 34-40, and optionally, wherein the instructions, when executed, cause the location mapper to determine the 2D mapping of the 2D locations of the plurality of pairs of wireless communication devices by determining a 2D distance matrix based on the plurality of 2D location vectors, and applying a Multi-Dimensional Scaling (MDS) algorithm to the 2D distance matrix.

Example 42 includes the subject matter of any one of Examples 34-41, and optionally, wherein a pair-wise distance estimation corresponding to the pair of the wireless communication devices is based on one or more measurements of wireless communication signals between the pair of the wireless communication devices.

Example 43 includes the subject matter of any one of Examples 34-42, and optionally, wherein a pair-wise distance estimation corresponding to the pair of the wireless communication devices comprises at least one of a Time of Flight (ToF) estimation, a Received Signal Strength Indicator (RSSI) estimation, or an Angle of Arrival (AoA) estimation.

Example 44 includes the subject matter of any one of Examples 34-43, and optionally, wherein at least one pair of the plurality of pairs of wireless communication devices comprises the location processing device, the instructions, when executed cause the location mapper to determine at least one pair-wise distance estimation corresponding to the at least one pair.

Example 45 includes a product comprising one or more tangible computer-readable non-transitory storage media comprising computer-executable instructions operable to, when executed by at least one processor, enable the at least one processor to cause a location processing device to determine a plurality of two-dimensional (2D) location vectors corresponding to a plurality of wireless communication devices based on a plurality of pair-wise distance estimations corresponding to a plurality of pairs of the wireless communication devices; determine a plurality of three-dimensional (3D) locations of the plurality of wireless communication devices based on a 2D to 3D (2D-3D) projection, the 2D-3D projection to project a 2D location vector of a wireless communication device to a 3D location of the wireless communication device by determining a plane corresponding to the wireless communication device and determining the 3D location of the wireless communication device based on a projection between the plane corresponding to the wireless communication device and a plane comprising the 2D location vector of the wireless communication device; and determine a 3D mapping of the plurality of wireless communication devices based on the plurality of 3D locations.

Example 46 includes the subject matter of Example 45, and optionally, wherein the instructions, when executed, cause the location processing device to determine the 3D location of the wireless communication device based on a requirement that a normal vector of the plane corresponding to the wireless communication device is parallel to a difference vector from the 2D location vector of the wireless communication device to the 3D location of the wireless communication device.

Example 47 includes the subject matter of Example 45 or 46, and optionally, wherein the instructions, when executed, cause the location processing device to determine a potential plane corresponding to the wireless communication device, to determine a potential 3D location based on a requirement that a normal vector of the potential plane is parallel to a difference vector from the 2D location vector of the wireless communication device to the potential 3D location, and to determine whether the potential 3D location is to be used as the 3D location of the wireless communication device based on whether the potential 3D location is on the potential plane.

Example 48 includes the subject matter of Example 47, and optionally, wherein the instructions, when executed, cause the location processing device to determine another potential plane to determine the 3D location of the wireless communication device if the potential 3D location is not on the potential plane.

Example 49 includes the subject matter of any one of Examples 45-48, and optionally, wherein the instructions, when executed, cause the location processing device to determine the plane corresponding to the wireless communication device based on an identifier of the device.

Example 50 includes the subject matter of any one of Examples 45-49, and optionally, wherein the instructions, when executed, cause the location processing device to select the plane corresponding to the wireless communication device from a plurality of predefined potential planes corresponding to the wireless communication device.

Example 51 includes the subject matter of any one of Examples 45-50, and optionally, wherein the instructions, when executed, cause the location processing device to determine the plurality of 2D location vectors by applying a localization algorithm to the plurality of pair-wise distance estimations.

Example 52 includes the subject matter of any one of Examples 45-51, and optionally, wherein the instructions, when executed, cause the location processing device to determine the plurality of 2D location vectors by determining a 2D distance matrix based on the plurality of pair-wise distance estimations, and applying a Multi-Dimensional Scaling (MDS) algorithm to the 2D distance matrix.

Example 53 includes the subject matter of any one of Examples 45-52, and optionally, wherein the instructions, when executed, cause the location processing device to determine the 3D mapping of the 3D locations of the plurality of wireless communication devices by applying a localization algorithm to the plurality of 3D locations.

Example 54 includes the subject matter of any one of Examples 45-53, and optionally, wherein the instructions, when executed, cause the location processing device to determine the 3D mapping of the 3D locations of the plurality of wireless communication devices by determining a 3D distance matrix based on the plurality of 3D locations, and applying a Multi-Dimensional Scaling (MDS) algorithm to the 3D distance matrix.

Example 55 includes the subject matter of any one of Examples 45-54, and optionally, wherein a pair-wise distance estimation corresponding to a pair of wireless communication devices is based on one or more measurements of wireless communication signals between the pair of wireless communication devices.

Example 56 includes the subject matter of any one of Examples 45-55, and optionally, wherein a pair-wise distance estimation corresponding to a pair of wireless communication devices comprises at least one of a Time of Flight (ToF) estimation, a Received Signal Strength Indicator (RSSI) estimation, or an Angle of Arrival (AoA) estimation.

Example 57 includes a method of location mapping comprising determining a plurality of two-dimensional (2D) location vectors corresponding to a plurality of wireless communication devices based on a plurality of pair-wise distance estimations corresponding to a plurality of pairs of the wireless communication devices; determining a plurality of three-dimensional (3D) locations of the plurality of wireless communication devices based on a 2D to 3D (2D-3D) projection, the 2D-3D projection to project a 2D location vector of a wireless communication device to a 3D location of the wireless communication device by determining a plane corresponding to the wireless communication device and determining the 3D location of the wireless communication device based on a projection between the plane corresponding to the wireless communication device and a plane comprising the 2D location vector of the wireless communication device; and determining a 3D mapping of the plurality of wireless communication devices based on the plurality of 3D locations.

Example 58 includes the subject matter of Example 57, and optionally, comprising determining the 3D location of the wireless communication device based on a requirement that a normal vector of the plane corresponding to the wireless communication device is parallel to a difference vector from the 2D location vector of the wireless communication device to the 3D location of the wireless communication device.

Example 59 includes the subject matter of Example 57 or 58, and optionally, comprising determining a potential plane corresponding to the wireless communication device, determining a potential 3D location based on a requirement that a normal vector of the potential plane is parallel to a difference vector from the 2D location vector of the wireless communication device to the potential 3D location, and determining whether the potential 3D location is to be used as the 3D location of the wireless communication device based on whether the potential 3D location is on the potential plane.

Example 60 includes the subject matter of Example 59, and optionally, comprising determining another potential plane to determine the 3D location of the wireless communication device if the potential 3D location is not on the potential plane.

Example 61 includes the subject matter of any one of Examples 57-60, and optionally, comprising determining the plane corresponding to the wireless communication device based on an identifier of the device.

Example 62 includes the subject matter of any one of Examples 57-61, and optionally, comprising selecting the plane corresponding to the wireless communication device from a plurality of predefined potential planes corresponding to the wireless communication device.

Example 63 includes the subject matter of any one of Examples 57-62, and optionally, comprising determining the plurality of 2D location vectors by applying a localization algorithm to the plurality of pair-wise distance estimations.

Example 64 includes the subject matter of any one of Examples 57-63, and optionally, comprising determining the plurality of 2D location vectors by determining a 2D distance matrix based on the plurality of pair-wise distance estimations, and applying a Multi-Dimensional Scaling (MDS) algorithm to the 2D distance matrix.

Example 65 includes the subject matter of any one of Examples 57-64, and optionally, comprising determining the 3D mapping of the 3D locations of the plurality of wireless communication devices by applying a localization algorithm to the plurality of 3D locations.

Example 66 includes the subject matter of any one of Examples 57-65, and optionally, comprising determining the 3D mapping of the 3D locations of the plurality of wireless communication devices by determining a 3D distance matrix based on the plurality of 3D locations, and applying a Multi-Dimensional Scaling (MDS) algorithm to the 3D distance matrix.

Example 67 includes the subject matter of any one of Examples 57-66, and optionally, wherein a pair-wise distance estimation corresponding to a pair of wireless communication devices is based on one or more measurements of wireless communication signals between the pair of wireless communication devices.

Example 68 includes the subject matter of any one of Examples 57-67, and optionally, wherein a pair-wise distance estimation corresponding to a pair of wireless communication devices comprises at least one of a Time of Flight (ToF) estimation, a Received Signal Strength Indicator (RSSI) estimation, or an Angle of Arrival (AoA) estimation.

Example 69 includes an apparatus of location mapping comprising means for determining a plurality of two-dimensional (2D) location vectors corresponding to a plurality of wireless communication devices based on a plurality of pair-wise distance estimations corresponding to a plurality of pairs of the wireless communication devices; means for determining a plurality of three-dimensional (3D) locations of the plurality of wireless communication devices based on a 2D to 3D (2D-3D) projection, the 2D-3D projection to project a 2D location vector of a wireless communication device to a 3D location of the wireless communication device by determining a plane corresponding to the wireless communication device and determining the 3D location of the wireless communication device based on a projection between the plane corresponding to the wireless communication device and a plane comprising the 2D location vector of the wireless communication device; and means for determining a 3D mapping of the plurality of wireless communication devices based on the plurality of 3D locations.

Example 70 includes the subject matter of Example 69, and optionally, comprising means for determining the 3D location of the wireless communication device based on a requirement that a normal vector of the plane corresponding to the wireless communication device is parallel to a difference vector from the 2D location vector of the wireless communication device to the 3D location of the wireless communication device.

Example 71 includes the subject matter of Example 69 or 70, and optionally, comprising means for determining a potential plane corresponding to the wireless communication device, determining a potential 3D location based on a requirement that a normal vector of the potential plane is parallel to a difference vector from the 2D location vector of the wireless communication device to the potential 3D location, and determining whether the potential 3D location is to be used as the 3D location of the wireless communication device based on whether the potential 3D location is on the potential plane.

Example 72 includes the subject matter of Example 71, and optionally, comprising means for determining another potential plane to determine the 3D location of the wireless communication device if the potential 3D location is not on the potential plane.

Example 73 includes the subject matter of any one of Examples 69-72, and optionally, comprising means for determining the plane corresponding to the wireless communication device based on an identifier of the device.

Example 74 includes the subject matter of any one of Examples 69-73, and optionally, comprising means for selecting the plane corresponding to the wireless communication device from a plurality of predefined potential planes corresponding to the wireless communication device.

Example 75 includes the subject matter of any one of Examples 69-74, and optionally, comprising means for determining the plurality of 2D location vectors by applying a localization algorithm to the plurality of pair-wise distance estimations.

Example 76 includes the subject matter of any one of Examples 69-75, and optionally, comprising means for determining the plurality of 2D location vectors by determining a 2D distance matrix based on the plurality of pair-wise distance estimations, and applying a Multi-Dimensional Scaling (MDS) algorithm to the 2D distance matrix.

Example 77 includes the subject matter of any one of Examples 69-76, and optionally, comprising means for determining the 3D mapping of the 3D locations of the plurality of wireless communication devices by applying a localization algorithm to the plurality of 3D locations.

Example 78 includes the subject matter of any one of Examples 69-77, and optionally, comprising means for determining the 3D mapping of the 3D locations of the plurality of wireless communication devices by determining a 3D distance matrix based on the plurality of 3D locations, and applying a Multi-Dimensional Scaling (MDS) algorithm to the 3D distance matrix.

Example 79 includes the subject matter of any one of Examples 69-78, and optionally, wherein a pair-wise distance estimation corresponding to a pair of wireless communication devices is based on one or more measurements of wireless communication signals between the pair of wireless communication devices.

Example 80 includes the subject matter of any one of Examples 69-79, and optionally, wherein a pair-wise distance estimation corresponding to a pair of wireless communication devices comprises at least one of a Time of Flight (ToF) estimation, a Received Signal Strength Indicator (RSSI) estimation, or an Angle of Arrival (AoA) estimation.

Example 81 includes a location processing device comprising a network interface to communicate via a communication network; a memory having stored thereon instructions; and a processor to execute the instructions, the instructions, when executed by the processor, to result in a location mapper configured to determine a plurality of two-dimensional (2D) location vectors corresponding to a plurality of wireless communication devices based on a plurality of pair-wise distance estimations corresponding to a plurality of pairs of the wireless communication devices; determine a plurality of three-dimensional (3D) locations of the plurality of wireless communication devices based on a 2D to 3D (2D-3D) projection, the 2D-3D projection to project a 2D location vector of a wireless communication device to a 3D location of the wireless communication device by determining a plane corresponding to the wireless communication device and determining the 3D location of the wireless communication device based on a projection between the plane corresponding to the wireless communication device and a plane comprising the 2D location vector of the wireless communication device; and determine a 3D mapping of the plurality of wireless communication devices based on the plurality of 3D locations.

Example 82 includes the subject matter of Example 81, and optionally, wherein the instructions, when executed, cause the location mapper to determine the 3D location of the wireless communication device based on a requirement that a normal vector of the plane corresponding to the wireless communication device is parallel to a difference vector from the 2D location vector of the wireless communication device to the 3D location of the wireless communication device.

Example 83 includes the subject matter of Example 81 or 82, and optionally, wherein the instructions, when executed, cause the location mapper to determine a potential plane corresponding to the wireless communication device, to determine a potential 3D location based on a requirement that a normal vector of the potential plane is parallel to a difference vector from the 2D location vector of the wireless communication device to the potential 3D location, and to determine whether the potential 3D location is to be used as the 3D location of the wireless communication device based on whether the potential 3D location is on the potential plane.

Example 84 includes the subject matter of Example 83, and optionally, wherein the instructions, when executed, cause the location mapper to determine another potential plane to determine the 3D location of the wireless communication device if the potential 3D location is not on the potential plane.

Example 85 includes the subject matter of any one of Examples 81-84, and optionally, wherein the instructions, when executed, cause the location mapper to determine the plane corresponding to the wireless communication device based on an identifier of the device.

Example 86 includes the subject matter of any one of Examples 81-85, and optionally, wherein the instructions, when executed, cause the location mapper to select the plane corresponding to the wireless communication device from a plurality of predefined potential planes corresponding to the wireless communication device.

Example 87 includes the subject matter of any one of Examples 81-86, and optionally, wherein the instructions, when executed, cause the location mapper to determine the plurality of 2D location vectors by applying a localization algorithm to the plurality of pair-wise distance estimations.

Example 88 includes the subject matter of any one of Examples 81-87, and optionally, wherein the instructions, when executed, cause the location mapper to determine the plurality of 2D location vectors by determining a 2D distance matrix based on the plurality of pair-wise distance estimations, and applying a Multi-Dimensional Scaling (MDS) algorithm to the 2D distance matrix.

Example 89 includes the subject matter of any one of Examples 81-88, and optionally, wherein the instructions, when executed, cause the location mapper to determine the 3D mapping of the 3D locations of the plurality of wireless communication devices by applying a localization algorithm to the plurality of 3D locations.

Example 90 includes the subject matter of any one of Examples 81-89, and optionally, wherein the instructions, when executed, cause the location mapper to determine the 3D mapping of the 3D locations of the plurality of wireless communication devices by determining a 3D distance matrix based on the plurality of 3D locations, and applying a Multi-Dimensional Scaling (MDS) algorithm to the 3D distance matrix.

Example 91 includes the subject matter of any one of Examples 81-90, and optionally, wherein a pair-wise distance estimation corresponding to a pair of wireless communication devices is based on one or more measurements of wireless communication signals between the pair of wireless communication devices.

Example 92 includes the subject matter of any one of Examples 81-91, and optionally, wherein a pair-wise distance estimation corresponding to a pair of wireless communication devices comprises at least one of a Time of Flight (ToF) estimation, a Received Signal Strength Indicator (RSSI) estimation, or an Angle of Arrival (AoA) estimation.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A product comprising one or more tangible computer-readable non-transitory storage media comprising computer-executable instructions operable to, when executed by at least one processor, enable the at least one processor to cause a location processing device to:
    determine, by the processor, a plurality of three-dimensional (3D) location vectors between a respective plurality of pairs of wireless communication devices based on a plurality of pair-wise distance estimations corresponding to the plurality of pairs of the wireless communication devices, a 3D location vector corresponding to a pair of wireless communication devices comprising a vector between estimated 3D locations of the pair of wireless communication devices;
    determine a plurality of two-dimensional (2D) location vectors of the plurality of pairs of wireless communication devices on a 2D plane by projecting the plurality of 3D location vectors onto the 2D plane, wherein the instructions, when executed, cause the location processing device to:
        determine a spanned plane, which is spanned by a first 3D location vector and a second 3D location vector, the first 3D location vector between estimated 3D locations of a first wireless communication device and a second wireless communication device, the second 3D location vector between estimated 3D locations of the second wireless communication device and a third wireless communication device;
        determine a first 2D location vector between the first wireless communication device and the second wireless communication device by projecting the first 3D location vector from the spanned plane to the 2D plane; and
        determine a second 2D location vector between the second wireless communication device and the third wireless communication device by projecting the second 3D location vector from the spanned plane to the 2D plane; and
    determine a 2D mapping of 2D locations of the plurality of pairs of wireless communication devices based on the plurality of 2D location vectors.

2. The product of claim 1, wherein the instructions, when executed, cause the location processing device to determine the first 2D location vector by applying to the first 3D location vector a projection $\{A(A^TA)^{-1}A^T\}$, and to determine the second 2D location vector by applying to the second 3D location vector the projection $\{A(A^TA)^{-1}A^T\}$, wherein A denotes a span of the first and second 3D location vectors.

3. The product of claim 1, wherein the instructions, when executed, cause the location processing device to select the first and second 3D location vectors from the plurality of 3D location vectors based on a determination that the first and second 3D location vectors are non-collinear.

4. The product of claim 1, wherein the instructions, when executed, cause the location processing device to determine the plurality of 3D location vectors by applying a localization algorithm to the plurality of pair-wise distance estimations.

5. The product of claim 1, wherein the instructions, when executed, cause the location processing device to determine the plurality of 3D location vectors by determining a 3D distance matrix based on the plurality of pair-wise distance estimations, and applying a Multi-Dimensional Scaling (MDS) algorithm to the 3D distance matrix.

6. The product of claim 1, wherein the instructions, when executed, cause the location processing device to determine the 2D mapping of the 2D locations of the plurality of pairs of wireless communication devices by applying a localization algorithm to the plurality of 2D location vectors.

7. The product of claim 1, wherein the instructions, when executed, cause the location processing device to determine the 2D mapping of the 2D locations of the plurality of pairs of wireless communication devices by determining a 2D distance matrix based on the plurality of 2D location vectors, and applying a Multi-Dimensional Scaling (MDS) algorithm to the 2D distance matrix.

8. The product of claim 1, wherein a pair-wise distance estimation corresponding to the pair of the wireless communication devices is based on one or more measurements of wireless communication signals between the pair of the wireless communication devices.

9. The product of claim 1, wherein a pair-wise distance estimation corresponding to the pair of the wireless communication devices comprises at least one of a Time of Flight (ToF) estimation, a Received Signal Strength Indicator (RSSI) estimation, or an Angle of Arrival (AoA) estimation.

10. The product of claim 1, wherein at least one pair of the plurality of pairs of wireless communication devices comprises the location processing device, the instructions, when executed cause the location processing device to determine at least one pair-wise distance estimation corresponding to said at least one pair.

11. An apparatus of location mapping comprising:
means for determining a plurality of three-dimensional (3D) location vectors between a respective plurality of pairs of wireless communication devices based on a plurality of pair-wise distance estimations corresponding to the plurality of pairs of the wireless communication devices, a 3D location vector corresponding to a pair of wireless communication devices comprising a vector between estimated 3D locations of the pair of wireless communication devices;
means for determining a plurality of two-dimensional (2D) location vectors of the plurality of pairs of wireless communication devices on a 2D plane by projecting the plurality of 3D location vectors onto the 2D plane, wherein the means for determining the plurality of 2D location vectors comprises means for:
  determining a spanned plane, which is spanned by a first 3D location vector and a second 3D location vector, the first 3D location vector between estimated 3D locations of a first wireless communication device and a second wireless communication device, the second 3D location vector between estimated 3D locations of the second wireless communication device and a third wireless communication device;
  determining a first 2D location vector between the first wireless communication device and the second wireless communication device by projecting the first 3D location vector from the spanned plane to the 2D plane; and
  determining a second 2D location vector between the second wireless communication device and the third wireless communication device by projecting the second 3D location vector from the spanned plane to the 2D plane; and
means for determining a 2D mapping of 2D locations of the plurality of pairs of wireless communication devices based on the plurality of 2D location vectors.

12. The apparatus of claim 11 comprising means for determining the plurality of 3D location vectors by determining a 3D distance matrix based on the plurality of pair-wise distance estimations, and applying a Multi-Dimensional Scaling (MDS) algorithm to the 3D distance matrix.

13. The apparatus of claim 11 comprising means for determining the first 2D location vector by applying to the first 3D location vector a projection $\{A(A^TA)^{-1}A^T\}$, and determining the second 2D location vector by applying to the second 3D location vector the projection $\{A(A^TA)^{-1}A^T\}$, wherein A denotes a span of the first and second 3D location vectors.

* * * * *

UNITED STATES PATENT AND TRADEMARK OFFICE
CERTIFICATE OF CORRECTION

| | |
|---|---|
| PATENT NO. | : 11,252,691 B2 |
| APPLICATION NO. | : 16/233417 |
| DATED | : February 15, 2022 |
| INVENTOR(S) | : Sudhanshu John et al. |

Page 1 of 1

It is certified that error appears in the above-identified patent and that said Letters Patent is hereby corrected as shown below:

On the Title Page

Item (71), delete "INTEL IP CORPORATION, Santa Clara, CA (US)" and insert -- INTEL CORPORATION, Santa Clara, CA (US) --, therefor Signed and Sealed this
Thirty-first Day of May, 2022

*Katherine Kelly Vidal*

Katherine Kelly Vidal
*Director of the United States Patent and Trademark Office*